(12) United States Patent
Ligtenberg et al.

(10) Patent No.: US 9,927,895 B2
(45) Date of Patent: Mar. 27, 2018

(54) INPUT/OUTPUT DEVICE WITH A DYNAMICALLY ADJUSTABLE APPEARANCE AND FUNCTION

(71) Applicant: Apple Inc., Cupertino, CA (US)

(72) Inventors: Chris Ligtenberg, Cupertino, CA (US);
Euan S. Abraham, Sunnyvale, CA (US); Jun Qi, Cupertino, CA (US);
Paul S. Drzaic, Cupertino, CA (US);
Po-Wen Chiu, Cupertino, CA (US);
Ron Hopkinson, Cupertino, CA (US);
Michelle Goldberg, Cupertino, CA (US); Victor H. Yin, Cupertino, CA (US); Bartley K. Andre, Cupertino, CA (US); Mikael Silvanto, Cupertino, CA (US); Erin Turullols, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 81 days.

(21) Appl. No.: 14/765,145

(22) PCT Filed: Feb. 6, 2014

(86) PCT No.: PCT/US2014/015142
§ 371 (c)(1),
(2) Date: Jul. 31, 2015

(87) PCT Pub. No.: WO2014/124165
PCT Pub. Date: Aug. 14, 2014

(65) Prior Publication Data
US 2015/0370339 A1    Dec. 24, 2015

Related U.S. Application Data

(60) Provisional application No. 61/761,294, filed on Feb. 6, 2013.

(51) Int. Cl.
*G06F 3/041* (2006.01)
*G09G 3/38* (2006.01)
(Continued)

(52) U.S. Cl.
CPC ............ *G06F 3/0412* (2013.01); *G06F 1/165* (2013.01); *G06F 1/1662* (2013.01);
(Continued)

(58) Field of Classification Search
CPC ...... G06F 1/1616; G06F 1/165; G06F 1/1662; G06F 1/1671; G06F 1/1692; G06F 3/023;
(Continued)

(56) References Cited

U.S. PATENT DOCUMENTS 3,657,492 A    4/1972    Arndt et al.
3,917,917 A    11/1975   Murata
(Continued)

FOREIGN PATENT DOCUMENTS

CN    2155620    2/1994
CN    2394309    8/2000
(Continued)

OTHER PUBLICATIONS

International Search Report and Written Opinion, PCT/US2014/015142, 11 pages, dated Feb. 24, 2015.
(Continued)

*Primary Examiner* — Michael J Eurice
(74) *Attorney, Agent, or Firm* — Brownstein Hyatt Farber Schreck, LLP

(57) ABSTRACT

A computing device is disclosed. The computing device may include a display, a processor in communication with the display and an enclosure connected to the display. The computing device may also include an input/output (I/O) device in communication with the processor. The I/O device may also be connected to the enclosure. Additionally, the I/O
(Continued)

device may include a modifiable display that may substantially match the appearance of the enclosure.

25 Claims, 15 Drawing Sheets

(51) Int. Cl.
　　*G06F 3/0488*　　　(2013.01)
　　*G06F 3/023*　　　(2006.01)
　　*G06F 3/02*　　　(2006.01)
　　G02F 1/1334　　　(2006.01)
　　G06F 1/16　　　(2006.01)
　　G02F 1/167　　　(2006.01)
　　G09G 3/34　　　(2006.01)

(52) U.S. Cl.
　　CPC ............ *G06F 1/1692* (2013.01); *G06F 3/023* (2013.01); *G06F 3/0219* (2013.01); *G06F 3/04886* (2013.01); *G02F 1/1334* (2013.01); *G02F 1/167* (2013.01); *G02F 2201/44* (2013.01); *G06F 1/1616* (2013.01); *G06F 1/1671* (2013.01); *G06F 2203/0339* (2013.01); *G09G 3/344* (2013.01); *G09G 2310/068* (2013.01)

(58) Field of Classification Search
　　CPC .. G06F 3/0219; G06F 3/0412; G06F 3/04886; G06F 2203/0339; G02F 1/1334; G02F 1/167; G02F 1/172; G02F 2201/44; G09G 3/344; G09G 2310/068
　　See application file for complete search history.

(56) References Cited

U.S. PATENT DOCUMENTS

| | | |
|---|---|---|
| 3,978,297 A | 8/1976 | Lynn et al. |
| 4,095,066 A | 6/1978 | Harris |
| 4,319,099 A | 3/1982 | Asher |
| 4,349,712 A | 9/1982 | Michalski |
| 4,484,042 A | 11/1984 | Matsui |
| 4,596,905 A | 6/1986 | Fowler |
| 4,598,181 A | 7/1986 | Selby |
| 4,670,084 A | 6/1987 | Durand et al. |
| 4,755,645 A | 7/1988 | Naoki et al. |
| 4,937,408 A | 6/1990 | Hattori et al. |
| 4,987,275 A | 1/1991 | Miller et al. |
| 5,021,638 A | 6/1991 | Nopper et al. |
| 5,092,459 A | 3/1992 | Uljanic et al. |
| 5,136,131 A | 8/1992 | Komaki |
| 5,278,372 A | 1/1994 | Takagi et al. |
| 5,280,146 A | 1/1994 | Inagaki et al. |
| 5,340,955 A | 8/1994 | Calvillo et al. |
| 5,382,762 A | 1/1995 | Mochizuki |
| 5,408,060 A | 4/1995 | Muurinen |
| 5,421,659 A | 6/1995 | Liang |
| 5,422,447 A | 6/1995 | Spence |
| 5,457,297 A | 10/1995 | Chen |
| 5,477,430 A | 12/1995 | LaRose et al. |
| 5,481,074 A | 1/1996 | English |
| 5,504,283 A | 4/1996 | Kako et al. |
| 5,512,719 A | 4/1996 | Okada et al. |
| 5,625,532 A | 4/1997 | Sellers |
| 5,804,780 A | 9/1998 | Bartha |
| 5,828,015 A | 10/1998 | Coulon |
| 5,847,337 A | 12/1998 | Chen |
| 5,874,700 A | 2/1999 | Hochgesang |
| 5,875,013 A | 2/1999 | Takahara |
| 5,876,106 A | 3/1999 | Kordecki et al. |
| 5,878,872 A | 3/1999 | Tsai |
| 5,881,866 A | 3/1999 | Miyajima et al. |
| 5,898,147 A | 4/1999 | Domzaiski et al. |
| 5,924,555 A | 7/1999 | Sadamori et al. |
| 5,935,691 A | 8/1999 | Tsai |
| 5,960,942 A | 10/1999 | Thornton |
| 5,986,227 A | 11/1999 | Hon |
| 6,020,565 A | 2/2000 | Pan |
| 6,068,416 A | 5/2000 | Kumamoto et al. |
| 6,215,420 B1 | 4/2001 | Harrison et al. |
| 6,257,782 B1 | 7/2001 | Maruyama et al. |
| 6,259,046 B1 | 7/2001 | Iwama et al. |
| 6,377,685 B1 | 4/2002 | Krishnan |
| 6,388,219 B2 | 5/2002 | Hsu et al. |
| 6,423,918 B1 | 7/2002 | King et al. |
| 6,482,032 B1 | 11/2002 | Szu et al. |
| 6,530,283 B2 | 3/2003 | Okada et al. |
| 6,542,355 B1 | 4/2003 | Huang |
| 6,552,287 B2 | 4/2003 | Janniere |
| 6,556,112 B1 | 4/2003 | Van Zeeland et al. |
| 6,559,399 B2 | 5/2003 | Hsu et al. |
| 6,560,612 B1 | 5/2003 | Yamada et al. |
| 6,572,289 B2 | 6/2003 | Lo et al. |
| 6,573,463 B2 | 6/2003 | Ono |
| 6,585,435 B2 | 7/2003 | Fang |
| 6,624,369 B2 | 9/2003 | Ito et al. |
| 6,706,986 B2 | 3/2004 | Hsu |
| 6,738,050 B2 | 5/2004 | Comiskey |
| 6,750,414 B2 | 6/2004 | Sullivan |
| 6,759,614 B2 | 7/2004 | Yoneyama |
| 6,762,381 B2 | 7/2004 | Kunthady et al. |
| 6,765,503 B1 | 7/2004 | Chan et al. |
| 6,797,906 B2 | 9/2004 | Ohashi |
| 6,850,227 B2 | 2/2005 | Takahashi et al. |
| 6,860,660 B2 | 3/2005 | Hochgesang et al. |
| 6,911,608 B2 | 6/2005 | Levy |
| 6,926,418 B2 | 8/2005 | Ostergangrd et al. |
| 6,940,030 B2 | 9/2005 | Takeda et al. |
| 6,977,352 B2 | 12/2005 | Oosawa |
| 6,979,792 B1 | 12/2005 | Lai |
| 6,987,466 B1 | 1/2006 | Welch et al. |
| 7,012,206 B2 | 3/2006 | Oikawa |
| 7,030,330 B2 | 4/2006 | Suda |
| 7,129,930 B1 | 10/2006 | Cathey et al. |
| 7,134,205 B2 | 11/2006 | Bruennel |
| 7,146,701 B2 | 12/2006 | Mahoney et al. |
| 7,151,236 B2 | 12/2006 | Ducruet et al. |
| 7,151,237 B2 | 12/2006 | Mahoney et al. |
| 7,154,059 B2 | 12/2006 | Chou |
| 7,166,813 B2 | 1/2007 | Soma |
| 7,172,303 B2 | 2/2007 | Shipman et al. |
| 7,189,932 B2 | 3/2007 | Kim |
| 7,301,113 B2 | 11/2007 | Nishimura et al. |
| 7,312,790 B2 | 12/2007 | Sato et al. |
| 7,378,607 B2 | 5/2008 | Koyano et al. |
| 7,385,806 B2 | 6/2008 | Liao |
| 7,391,555 B2 | 6/2008 | Albert et al. |
| 7,414,213 B2 | 8/2008 | Hwang |
| 7,429,707 B2 | 9/2008 | Yanai et al. |
| 7,432,460 B2 | 10/2008 | Clegg |
| 7,510,342 B2 | 3/2009 | Lane et al. |
| 7,531,764 B1 | 5/2009 | Lev et al. |
| 7,541,554 B2 | 6/2009 | Hou |
| 7,589,292 B2 | 9/2009 | Jung et al. |
| 7,639,187 B2 | 12/2009 | Caballero et al. |
| 7,639,571 B2 | 12/2009 | Ishii et al. |
| 7,679,010 B2 | 3/2010 | Wingett |
| 7,724,415 B2 | 5/2010 | Yamaguchi |
| 7,781,690 B2 | 8/2010 | Ishii |
| 7,813,774 B2 | 10/2010 | Perez-Noguera |
| 7,842,895 B2 | 11/2010 | Lee |
| 7,847,204 B2 | 12/2010 | Tsai |
| 7,851,819 B2 | 12/2010 | Shi |
| 7,866,866 B2 | 1/2011 | Wahlstrom |
| 7,893,376 B2 | 2/2011 | Chen |
| 7,923,653 B2 | 4/2011 | Ohsumi |
| 7,947,915 B2 | 5/2011 | Lee et al. |
| 7,999,748 B2 | 8/2011 | Ligtenberg et al. |
| 8,063,325 B2 | 11/2011 | Sung et al. |
| 8,077,096 B2 | 12/2011 | Chiang et al. |
| 8,080,744 B2 | 12/2011 | Yeh et al. |
| 8,098,228 B2 | 1/2012 | Shimodaira et al. |
| 8,109,650 B2 | 2/2012 | Chang et al. |

(56) References Cited

U.S. PATENT DOCUMENTS

| | | |
|---|---|---|
| 8,119,945 B2 | 2/2012 | Lin |
| 8,124,903 B2 | 2/2012 | Tatehata et al. |
| 8,134,094 B2 | 3/2012 | Tsao et al. |
| 8,156,172 B2 | 4/2012 | Muehl et al. |
| 8,178,808 B2 | 5/2012 | Strittmatter et al. |
| 8,184,021 B2 | 5/2012 | Chou |
| 8,212,160 B2 | 7/2012 | Tsao |
| 8,212,162 B2 | 7/2012 | Zhou |
| 8,218,301 B2 | 7/2012 | Lee |
| 8,232,958 B2 | 7/2012 | Tolbert |
| 8,246,228 B2 | 8/2012 | Ko et al. |
| 8,253,048 B2 | 8/2012 | Ozias et al. |
| 8,253,052 B2 | 9/2012 | Chen |
| 8,263,887 B2 | 9/2012 | Chen et al. |
| 8,289,280 B2 | 10/2012 | Travis |
| 8,299,382 B2 | 10/2012 | Takemae et al. |
| 8,317,384 B2 | 11/2012 | Chung et al. |
| 8,319,298 B2 | 11/2012 | Hsu |
| 8,325,141 B2 | 12/2012 | Marsden |
| 8,330,725 B2 | 12/2012 | Mahowald et al. |
| 8,354,629 B2 | 1/2013 | Lin |
| 8,378,857 B2 | 2/2013 | Pance |
| 8,383,972 B2 | 2/2013 | Liu |
| 8,384,566 B2 | 2/2013 | Bocirnea |
| 8,404,990 B2 | 3/2013 | Lutgring et al. |
| 8,451,146 B2 | 3/2013 | Mahowald et al. |
| 8,431,849 B2 | 4/2013 | Chen |
| 8,436,265 B2 | 5/2013 | Koike et al. |
| 8,462,514 B2 | 6/2013 | Myers et al. |
| 8,500,348 B2 | 8/2013 | Dumont et al. |
| 8,502,094 B2 | 8/2013 | Chen |
| 8,542,194 B2 | 9/2013 | Akens et al. |
| 8,548,528 B2 | 10/2013 | Kim et al. |
| 8,569,639 B2 | 10/2013 | Strittmatter |
| 8,575,632 B2 | 11/2013 | Kuramoto et al. |
| 8,581,127 B2 | 11/2013 | Jhuang et al. |
| 8,592,699 B2 | 11/2013 | Kessler et al. |
| 8,592,702 B2 | 11/2013 | Tsai |
| 8,592,703 B2 | 11/2013 | Johnson et al. |
| 8,604,370 B2 | 12/2013 | Chao |
| 8,629,362 B1 | 1/2014 | Knighton et al. |
| 8,642,904 B2 | 2/2014 | Chiba et al. |
| 8,651,720 B2 | 2/2014 | Sherman et al. |
| 8,659,882 B2 | 2/2014 | Liang et al. |
| 8,731,618 B2 | 5/2014 | Jarvis et al. |
| 8,748,767 B2 | 6/2014 | Ozias et al. |
| 8,759,705 B2 | 6/2014 | Funakoshi et al. |
| 8,760,405 B2 | 6/2014 | Nam |
| 8,786,548 B2 | 7/2014 | Oh et al. |
| 8,791,378 B2 | 7/2014 | Lan |
| 8,835,784 B2 | 9/2014 | Hirota |
| 8,847,090 B2 | 9/2014 | Ozaki |
| 8,847,711 B2 | 9/2014 | Yang et al. |
| 8,853,580 B2 | 10/2014 | Chen |
| 8,854,312 B2 | 10/2014 | Meierling |
| 8,870,477 B2 | 10/2014 | Merminod et al. |
| 8,884,174 B2 | 11/2014 | Chou et al. |
| 8,921,473 B1* | 12/2014 | Hyman .................. C08K 3/04 423/445 R |
| 8,943,427 B2 | 1/2015 | Heo et al. |
| 8,976,117 B2 | 3/2015 | Krahenbuhl et al. |
| 9,012,795 B2 | 4/2015 | Niu et al. |
| 9,029,723 B2 | 5/2015 | Pegg |
| 9,063,627 B2 | 6/2015 | Yairi et al. |
| 9,064,642 B2 | 6/2015 | Welch et al. |
| 9,086,733 B2 | 7/2015 | Pance |
| 9,087,663 B2 | 7/2015 | Los |
| 9,093,229 B2 | 7/2015 | Leong et al. |
| 9,213,416 B2 | 12/2015 | Chen |
| 9,223,352 B2 | 12/2015 | Smith et al. |
| 9,234,486 B2 | 1/2016 | Das et al. |
| 9,274,654 B2 | 3/2016 | Slobodin et al. |
| 9,275,810 B2 | 3/2016 | Pance et al. |
| 9,300,033 B2 | 3/2016 | Han et al. |
| 9,443,672 B2 | 9/2016 | Martisauskas |
| 9,448,628 B2 | 9/2016 | Tan et al. |
| 9,471,185 B2 | 10/2016 | Guard |
| 9,477,382 B2 | 10/2016 | Hicks et al. |
| 9,612,674 B2 | 4/2017 | Degner et al. |
| 2002/0033792 A1* | 3/2002 | Inoue .................. G02F 1/167 345/107 |
| 2002/0079211 A1 | 6/2002 | Katayama et al. |
| 2002/0093436 A1 | 7/2002 | Lien |
| 2002/0113770 A1 | 8/2002 | Jacobson et al. |
| 2002/0145792 A1* | 10/2002 | Jacobson .................. B41J 2/01 359/296 |
| 2002/0149835 A1* | 10/2002 | Kanbe .................. G02F 1/167 359/296 |
| 2002/0150827 A1* | 10/2002 | Kawai .................. G02F 1/167 430/20 |
| 2003/0011560 A1* | 1/2003 | Albert .................. G02F 1/167 345/107 |
| 2003/0169232 A1 | 9/2003 | Ito |
| 2003/0231162 A1* | 12/2003 | Kishi .................. G02F 1/167 345/107 |
| 2004/0004559 A1 | 1/2004 | Rast |
| 2004/0061927 A1* | 4/2004 | Kanbe .................. G02F 1/167 359/296 |
| 2004/0225965 A1 | 11/2004 | Garside et al. |
| 2004/0257247 A1 | 12/2004 | Lin et al. |
| 2005/0035950 A1 | 2/2005 | Daniels |
| 2005/0253801 A1 | 11/2005 | Kobayashi |
| 2006/0011458 A1 | 1/2006 | Purcocks |
| 2006/0020469 A1* | 1/2006 | Rast .................. G02F 1/167 704/270 |
| 2006/0120790 A1 | 6/2006 | Chang |
| 2006/0181511 A1 | 8/2006 | Woolley |
| 2006/0243987 A1 | 11/2006 | Lai |
| 2007/0200823 A1 | 8/2007 | Bytheway et al. |
| 2007/0285393 A1 | 12/2007 | Ishakov |
| 2008/0131184 A1 | 6/2008 | Brown et al. |
| 2008/0136782 A1 | 6/2008 | Mundt et al. |
| 2008/0251370 A1 | 10/2008 | Aoki |
| 2009/0046053 A1* | 2/2009 | Shigehiro .................. G09G 3/344 345/107 |
| 2009/0103964 A1 | 4/2009 | Takagi et al. |
| 2009/0128496 A1 | 5/2009 | Huang |
| 2009/0262085 A1* | 10/2009 | Wassingbo .................. G06F 3/03547 345/173 |
| 2009/0267892 A1 | 10/2009 | Faubert |
| 2010/0045705 A1 | 2/2010 | Vertegaal et al. |
| 2010/0066568 A1 | 3/2010 | Lee |
| 2010/0109921 A1* | 5/2010 | Annerfors .................. H01H 13/82 341/34 |
| 2010/0156796 A1* | 6/2010 | Kim .................. G06F 1/1616 345/168 |
| 2010/0177036 A1* | 7/2010 | Nam .................. G06F 1/1616 345/156 |
| 2010/0213041 A1* | 8/2010 | Chen .................. H01H 13/705 200/314 |
| 2010/0253630 A1 | 10/2010 | Homma et al. |
| 2010/0273530 A1* | 10/2010 | Jarvis .................. F16F 1/027 455/566 |
| 2011/0032127 A1 | 2/2011 | Roush |
| 2011/0056817 A1 | 3/2011 | Wu |
| 2011/0056836 A1 | 3/2011 | Tatebe et al. |
| 2011/0205179 A1 | 8/2011 | Braun |
| 2011/0261031 A1 | 10/2011 | Muto |
| 2011/0267272 A1 | 11/2011 | Meyer et al. |
| 2011/0284355 A1 | 11/2011 | Yang |
| 2011/0303521 A1* | 12/2011 | Niu .................. H01H 3/122 200/517 |
| 2012/0001889 A1* | 1/2012 | Kimura .................. G09G 3/344 345/212 |
| 2012/0012446 A1 | 1/2012 | Hwa |
| 2012/0032972 A1 | 2/2012 | Hwang |
| 2012/0066865 A1* | 3/2012 | Lauder .................. G06F 1/1626 16/382 |
| 2012/0090973 A1 | 4/2012 | Liu |
| 2012/0098751 A1 | 4/2012 | Liu |
| 2012/0286701 A1 | 11/2012 | Yang et al. |
| 2012/0298496 A1 | 11/2012 | Zhang |
| 2012/0313856 A1 | 12/2012 | Hsieh |

(56) References Cited

U.S. PATENT DOCUMENTS

| | | |
|---|---|---|
| 2013/0043115 A1 | 2/2013 | Yang et al. |
| 2013/0050090 A1* | 2/2013 | Stewart .............. G06F 3/04886 345/168 |
| 2013/0050134 A1* | 2/2013 | Stewart .................. G06F 3/041 345/174 |
| 2013/0050135 A1* | 2/2013 | Stewart .............. G06F 3/04895 345/174 |
| 2013/0093500 A1 | 4/2013 | Bruwer |
| 2013/0093733 A1 | 4/2013 | Yoshida |
| 2013/0100030 A1 | 4/2013 | Los et al. |
| 2013/0120265 A1 | 5/2013 | Horii et al. |
| 2013/0161170 A1 | 6/2013 | Fan et al. |
| 2013/0215079 A1 | 8/2013 | Johnson et al. |
| 2013/0242601 A1 | 9/2013 | Kloeppel et al. |
| 2013/0270090 A1 | 10/2013 | Lee |
| 2014/0008196 A1* | 1/2014 | Martisauskas ....... H03K 17/962 200/5 A |
| 2014/0015777 A1 | 1/2014 | Park et al. |
| 2014/0027259 A1 | 1/2014 | Kawana et al. |
| 2014/0071654 A1 | 3/2014 | Chien |
| 2014/0082490 A1 | 3/2014 | Jung et al. |
| 2014/0090967 A1 | 4/2014 | Inagaki |
| 2014/0098042 A1 | 4/2014 | Kuo et al. |
| 2014/0116865 A1 | 5/2014 | Leong et al. |
| 2014/0118264 A1 | 5/2014 | Leong et al. |
| 2014/0151211 A1 | 6/2014 | Zhang |
| 2014/0173482 A1* | 6/2014 | Hicks .................... G06F 3/0483 715/769 |
| 2014/0184496 A1* | 7/2014 | Gribetz ................ G02B 27/017 345/156 |
| 2014/0191973 A1 | 7/2014 | Zellers et al. |
| 2014/0218851 A1 | 8/2014 | Klein et al. |
| 2014/0252881 A1 | 9/2014 | Dinh et al. |
| 2014/0285961 A1* | 9/2014 | Nam .................... G06F 1/1616 361/679.28 |
| 2014/0291133 A1 | 10/2014 | Fu et al. |
| 2014/0320436 A1 | 10/2014 | Modarres et al. |
| 2014/0346025 A1 | 11/2014 | Hendren et al. |
| 2014/0375141 A1 | 12/2014 | Nakajima |
| 2015/0016038 A1 | 1/2015 | Niu et al. |
| 2015/0083561 A1 | 3/2015 | Han et al. |
| 2015/0090570 A1 | 4/2015 | Kwan et al. |
| 2015/0090571 A1 | 4/2015 | Leong et al. |
| 2015/0227207 A1 | 8/2015 | Winter et al. |
| 2015/0243457 A1 | 8/2015 | Niu et al. |
| 2015/0270073 A1 | 9/2015 | Yarak, III et al. |
| 2015/0277559 A1 | 10/2015 | Vescovi et al. |
| 2015/0287553 A1 | 10/2015 | Welch et al. |
| 2015/0309538 A1 | 10/2015 | Zhang |
| 2015/0332874 A1 | 11/2015 | Brock et al. |
| 2015/0348726 A1 | 12/2015 | Hendren |
| 2015/0378391 A1 | 12/2015 | Huitema et al. |
| 2016/0049266 A1 | 2/2016 | Stringer et al. |
| 2016/0093452 A1 | 3/2016 | Zercoe et al. |
| 2016/0098107 A1 | 4/2016 | Morrell et al. |
| 2016/0172129 A1 | 6/2016 | Zercoe et al. |
| 2016/0189890 A1 | 6/2016 | Leong et al. |
| 2016/0189891 A1 | 6/2016 | Zercoe et al. |
| 2016/0259375 A1 | 9/2016 | Andre et al. |
| 2016/0329166 A1 | 11/2016 | Hou et al. |
| 2016/0336124 A1 | 11/2016 | Leong et al. |
| 2016/0336127 A1 | 11/2016 | Leong et al. |
| 2016/0336128 A1 | 11/2016 | Leong et al. |
| 2016/0343523 A1 | 11/2016 | Hendren et al. |
| 2016/0351360 A1 | 12/2016 | Knopf et al. |
| 2016/0365204 A1 | 12/2016 | Cao et al. |
| 2016/0378234 A1 | 12/2016 | Ligtenberg et al. |
| 2016/0379775 A1 | 12/2016 | Leong et al. |
| 2017/0004937 A1 | 1/2017 | Leong et al. |
| 2017/0004939 A1 | 1/2017 | Kwan et al. |
| 2017/0011869 A1 | 1/2017 | Knopf et al. |
| 2017/0090106 A1 | 3/2017 | Cao et al. |

FOREIGN PATENT DOCUMENTS

| | | |
|---|---|---|
| CN | 1533128 | 9/2004 |
| CN | 1542497 | 11/2004 |
| CN | 2672832 | 1/2005 |
| CN | 1624842 | 6/2005 |
| CN | 1812030 | 8/2006 |
| CN | 1838036 | 9/2006 |
| CN | 1855332 | 11/2006 |
| CN | 101051569 | 10/2007 |
| CN | 200961844 | 10/2007 |
| CN | 200986871 | 12/2007 |
| CN | 101146137 | 3/2008 |
| CN | 201054315 | 4/2008 |
| CN | 201084602 | 7/2008 |
| CN | 201123174 | 9/2008 |
| CN | 201149829 | 11/2008 |
| CN | 101315841 | 12/2008 |
| CN | 201210457 | 3/2009 |
| CN | 101438228 | 5/2009 |
| CN | 101465226 | 6/2009 |
| CN | 101494130 | 7/2009 |
| CN | 101502082 | 8/2009 |
| CN | 201298481 | 8/2009 |
| CN | 101546667 | 9/2009 |
| CN | 101572195 | 11/2009 |
| CN | 101800281 | 8/2010 |
| CN | 101807482 | 8/2010 |
| CN | 101868773 | 10/2010 |
| CN | 201655616 | 11/2010 |
| CN | 102110542 | 6/2011 |
| CN | 102119430 | 7/2011 |
| CN | 201904256 | 7/2011 |
| CN | 102163084 | 8/2011 |
| CN | 201927524 | 8/2011 |
| CN | 201945951 | 8/2011 |
| CN | 201945952 | 8/2011 |
| CN | 201956238 | 8/2011 |
| CN | 102197452 | 9/2011 |
| CN | 202008941 | 10/2011 |
| CN | 202040690 | 11/2011 |
| CN | 102280292 | 12/2011 |
| CN | 102338348 | 2/2012 |
| CN | 102375550 | 3/2012 |
| CN | 202205161 | 4/2012 |
| CN | 102496509 | 6/2012 |
| CN | 10269527 | 8/2012 |
| CN | 102622089 | 8/2012 |
| CN | 102629526 | 8/2012 |
| CN | 202372927 | 8/2012 |
| CN | 102679239 | 9/2012 |
| CN | 102683072 | 9/2012 |
| CN | 202434387 | 9/2012 |
| CN | 202523007 | 11/2012 |
| CN | 102832068 | 12/2012 |
| CN | 102955573 | 3/2013 |
| CN | 102956386 | 3/2013 |
| CN | 102969183 | 3/2013 |
| CN | 103000417 | 3/2013 |
| CN | 103165327 | 6/2013 |
| CN | 103180979 | 6/2013 |
| CN | 203012648 | 6/2013 |
| CN | 203135988 | 8/2013 |
| CN | 103377841 | 10/2013 |
| CN | 103489986 | 1/2014 |
| CN | 203414880 | 1/2014 |
| CN | 103681056 | 3/2014 |
| CN | 103699181 | 4/2014 |
| CN | 203520312 | 4/2014 |
| CN | 203588895 | 5/2014 |
| CN | 103839715 | 6/2014 |
| CN | 103839720 | 6/2014 |
| CN | 103839722 | 6/2014 |
| CN | 103903891 | 7/2014 |
| CN | 103956290 | 7/2014 |
| CN | 203733685 | 7/2014 |
| CN | 104021968 | 9/2014 |
| CN | 204102769 | 1/2015 |
| CN | 204117915 | 1/2015 |

(56) References Cited

FOREIGN PATENT DOCUMENTS

| | | |
|---|---|---|
| CN | 104517769 | 4/2015 |
| CN | 204632641 | 9/2015 |
| CN | 105097341 | 11/2015 |
| DE | 2530176 | 1/1977 |
| DE | 3002772 | 7/1981 |
| DE | 29704100 | 4/1997 |
| DE | 202008001970 | 8/2008 |
| EP | 0441993 | 8/1991 |
| EP | 1835272 | 9/2007 |
| EP | 1928008 | 6/2008 |
| EP | 2022606 | 6/2010 |
| EP | 2426688 | 3/2012 |
| EP | 2439760 | 4/2012 |
| EP | 2463798 | 6/2012 |
| EP | 2664979 | 11/2013 |
| FR | 2147420 | 3/1973 |
| FR | 2911000 | 7/2008 |
| FR | 2950193 | 3/2011 |
| GB | 1361459 | 7/1974 |
| JP | S50115562 | 9/1975 |
| JP | S60055477 | 3/1985 |
| JP | S61172422 | 10/1986 |
| JP | S62072429 | 4/1987 |
| JP | S63182024 | 11/1988 |
| JP | H0422024 | 4/1992 |
| JP | H0520963 | 1/1993 |
| JP | H0524512 | 8/1993 |
| JP | H05342944 | 12/1993 |
| JP | H09204148 | 8/1997 |
| JP | H10312726 | 11/1998 |
| JP | H11194882 | 7/1999 |
| JP | 2000010709 | 1/2000 |
| JP | 2000057871 | 2/2000 |
| JP | 2000339097 | 12/2000 |
| JP | 2001100889 | 4/2001 |
| JP | 2003114751 | 9/2001 |
| JP | 2002260478 | 9/2002 |
| JP | 2002298689 | 10/2002 |
| JP | 2003522998 | 7/2003 |
| JP | 2005108041 | 4/2005 |
| JP | 2006164929 | 6/2006 |
| JP | 2006185906 | 7/2006 |
| JP | 2006521664 | 9/2006 |
| JP | 2006269439 | 10/2006 |
| JP | 2006277013 | 10/2006 |
| JP | 2006344609 | 12/2006 |
| JP | 2007115633 | 5/2007 |
| JP | 2007514247 | 5/2007 |
| JP | 2007156983 | 6/2007 |
| JP | 2008021428 | 1/2008 |
| JP | 2008041431 | 2/2008 |
| JP | 2008100129 | 5/2008 |
| JP | 2008191850 | 8/2008 |
| JP | 2008533559 | 8/2008 |
| JP | 2008293922 | 12/2008 |
| JP | 2009099503 | 5/2009 |
| JP | 2009181894 | 8/2009 |
| JP | 2010061956 | 3/2010 |
| JP | 2010244088 | 10/2010 |
| JP | 2010244302 | 10/2010 |
| JP | 2011018484 | 1/2011 |
| JP | 2011065126 | 3/2011 |
| JP | 2011150804 | 8/2011 |
| JP | 2011165630 | 8/2011 |
| JP | 2011524066 | 8/2011 |
| JP | 2011187297 | 9/2011 |
| JP | 2012022473 | 2/2012 |
| JP | 2012043705 | 3/2012 |
| JP | 2012063630 | 3/2012 |
| JP | 2012098873 | 5/2012 |
| JP | 2012134064 | 7/2012 |
| JP | 2012186067 | 9/2012 |
| JP | 2012230256 | 11/2012 |
| JP | 2014017179 | 1/2014 |
| JP | 2014026807 | 2/2014 |
| JP | 2014216190 | 11/2014 |
| JP | 2014220039 | 11/2014 |
| JP | 2016053778 | 4/2016 |
| KR | 1019990007394 | 1/1999 |
| KR | 1020020001668 | 1/2002 |
| KR | 100454203 | 10/2004 |
| KR | 1020060083032 | 7/2006 |
| KR | 1020080064116 | 7/2008 |
| KR | 1020080066164 | 7/2008 |
| KR | 2020110006385 | 6/2011 |
| KR | 1020120062797 | 6/2012 |
| KR | 1020130040131 | 4/2013 |
| KR | 20150024201 | 3/2015 |
| TW | 200703396 | 1/2007 |
| TW | M334397 | 6/2008 |
| TW | 201108284 | 3/2011 |
| TW | 201108286 | 3/2011 |
| TW | M407429 | 7/2011 |
| TW | 201246251 | 11/2012 |
| TW | 201403646 | 1/2014 |
| WO | WO9744946 | 11/1997 |
| WO | WO2005/057320 | 6/2005 |
| WO | WO2006/022313 | 3/2006 |
| WO | WO2007/049253 | 5/2007 |
| WO | WO2008/045833 | 4/2008 |
| WO | WO2009/005026 | 1/2009 |
| WO | WO2012/011282 | 1/2012 |
| WO | WO2012/027978 | 3/2012 |
| WO | WO2013/096478 | 6/2013 |
| WO | WO2014175446 | 10/2014 |

OTHER PUBLICATIONS

Elekson, "Reliable and Tested Wearable Electronics Embedment Solutions," http://www.wearable.technology/our-technologies, 3 pages, at least as early as Jan. 6, 2016.

* cited by examiner

US 9,927,895 B2

INPUT/OUTPUT DEVICE WITH A DYNAMICALLY ADJUSTABLE APPEARANCE AND FUNCTION

CROSS REFERENCE TO RELATED APPLICATION

This application is a 35 U.S.C. §371 application of PCT/US2014/015142, filed Feb. 6, 2014 and titled "Input/Output Device with a Dynamically Adjustable Appearance and Function," which claims priority to U.S. Provisional Patent Application No. 61/761,294, filed Feb. 6, 2013 and titled "Input/Output Device with a Dynamically Adjustable Appearance and Function," the disclosures of which are hereby incorporated by reference herein in their entireties.

TECHNICAL FIELD

The present invention relates generally to electronic devices, and more specifically to input/output devices for electronic devices.

BACKGROUND

Computers and other electronic devices typically include one or more input devices, such as mice, keyboards, joysticks, and the like so a user can more easily interact with the device in question. Often, these input devices may be integrated with or into the associated electronic device. For example, a laptop computer may include a keyboard operably connected to its internal systems and housed within its enclosure. Similarly, a laptop computer may also include a track pad or other motion-based input device that may also be integrated with the enclosure.

Many input devices have a static appearance, even if they can provide multiple functions or types of inputs to the electronic device. For example, the numerical keys on a conventional QWERTY keyboard include a number input function and a symbol input. However, in many conventional keyboards, these two options are displayed statically on the respective keys and during use, a user may not be aware which input function is activated and may accidentally select the symbol input function when a number input is desired. Additionally, the appearance of many input devices may be separate or distinguished from the enclosure of the electronic device or the enclosure of the input device. This may detract from a uniform appearance of the device and may reduce the contrast of the glyphs or symbols on the input device.

SUMMARY

Some embodiments described herein include a computing device having a dynamically modifiable input/output device. The computing device may include a display, a processor in communication with the display, an enclosure connected to the display and an input/output device in communication with the processor and connected to the enclosure. The input/output device is dynamically modifiable to change its size, shape, or displayed graphic. Additionally, the input/output device has an appearance that substantially matches the appearance of the enclosure.

Another embodiment may take the form of a computing input device, including: a first input region located on a surface of the input device; a second input region located on the surface of the input device; wherein the first input region is configured to accept a first input through operation of a first input mechanism; the second input region is configured to accept a second input through operation of a second input mechanism; the second input region is further configured to dynamically adjust its appearance; and the input device is one of a keyboard, track pad or mouse.

DETAILED DESCRIPTION

Figure 1:
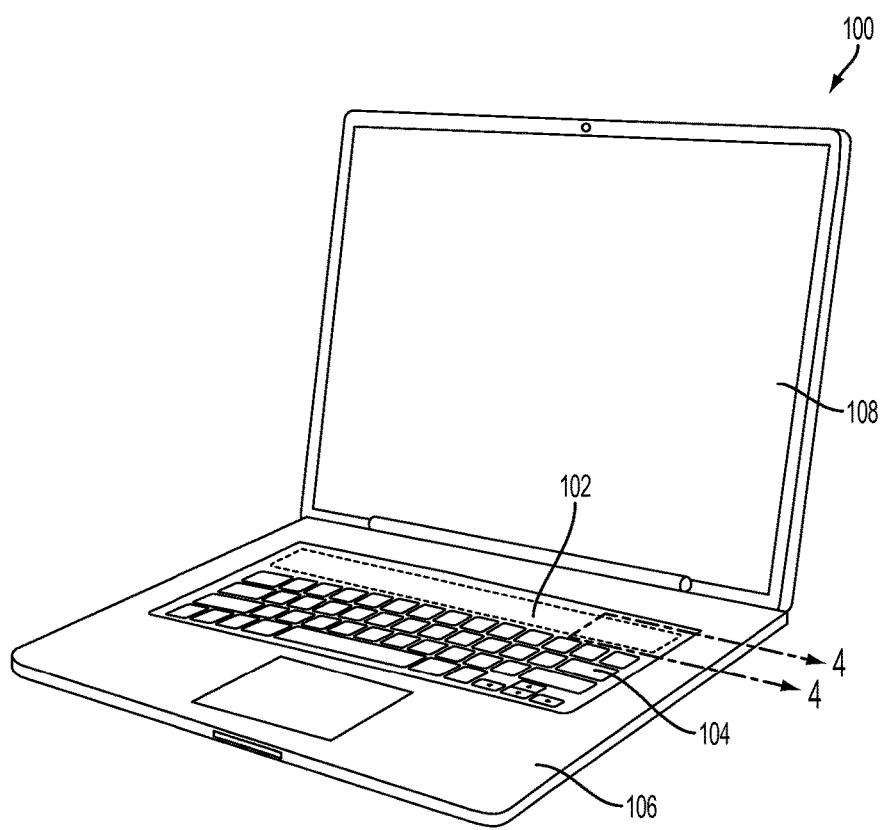
FIG. 1 is a perspective view of a computing device incorporating a sample I/O device.

Some embodiments described herein may take the form of an input/output (I/O) device that may provide input to an associated electronic device, such as a computing device. As used herein, the terms "electronic device" and "computing device" are generally interchangeable. Sample electronic devices include a personal computer, tablet computing device, smart phone, television or other audiovisual component, and so forth. The I/O device provides a user the ability to provide inputs to the electronic device, as well as providing feedback (visual or haptic) to the user. In some implementations, the I/O device may replace one or more keys of a conventional keyboard or the I/O may be used in addition to a conventional keyboard to provide expanded input/output functionality. As another example, the I/O device may be used as a separate input device, such as a track pad, display, or the like.

In one embodiment, the I/O device may form a portion or strip of a keyboard. In this embodiment, the I/O device may include dynamically adjustable glyphs or symbols. Additionally or alternatively, the I/O device may include one or more button or key sections that may also be dynamically reconfigurable. For example, the I/O device may form a legend for a keyboard and may include five keys in a first mode and two keys in the second mode. Continuing with this example, in the second mode, the space of the I/O device may be divided (visually or otherwise) from five distinct "areas" into two areas that form the two keys or buttons. (It should be appreciated that the "keys" of the legend need not be physically separate keys, but instead may be discrete portions of a strip or surface forming the legend.) The reconfiguration of the I/O device allows the I/O device to vary the output viewed by a user, such as the symbol on a particular key, based at least on a predetermined program or previously entered input. As a specific example, when the user has selects the shift or function button, the symbols on the keys may change to the function input rather than the standard input, such as changing the number 1 symbol to an exclamation symbol. As another example, the symbols on the legend may vary with the application being executed on the associated electronic device, an environment of the associated electronic device, a time of day, a sensor input to either the I/O device or the associated electronic device, a geographic location, and so on. As one example, the symbols on the legend may be updated based on a global positioning system coordinate (e.g., waypoint), a WiFi signal, a cell or radio wave signal, or the like. In this example, the legend may update to display a native language, alphabet, symbols corresponding to nearby locations, or the like.

The I/O device may include discrete keys, which may dynamically vary based on any or all of the foregoing factors. In embodiments including dynamic keys, the number, shape, and/or size of the keys also may vary based on a current state of the computing device or any of the foregoing factors. For example, during a game function, the I/O device may be divided into six or more separate keys and in a music listening function, the I/O device may include a single key. In the latter example, the single key may provide a dynamically variable input, such as a slider input (e.g., an input that varies with sliding a finger along its length or a rocker switch type input). Additionally and/or alternatively, the viewable shape of the key may change from a rectangular shape to a round shape, or other geometric or non-geometric shape.

As one example, the I/O device may be a reconfigurable bar or input row on the computing device. In this example, the I/O device may replace one or more rows of the keyboard, e.g., the top number and/or function row of a QWERTY keyboard. The I/O device may provide input to the computing device, as well as vary the output or feedback to a user. In other embodiments, the I/O device may be provided in addition to the normal keys on a keyboard, buttons on a mouse or other inputs typically associated with the object with which the I/O device is associated.

The I/O device may be modified to create or enhance a desired or useful appearance. The desired appearance may be selected to enhance the visibility of the I/O device in certain lights (e.g., in daylight conditions, increased contrast between the I/O device 102 and the enclosure), or the like. In some embodiments, aspects of the I/O device may be configured to match similar aspects of an enclosure for the electronic device, such as a color or texture of an enclosure, an accent color for the electronic device (e.g., a trim color or trademark or graphic color), or may otherwise be configured to have a texture, pattern, or color as desired. By matching the appearance of the enclosure or other component, one or more viewable characteristics of the I/O device may be enhanced. For example, the contrast, brightness, hue, or the like of the displayed images may be increased or decreased to be better viewable to a user.

In some embodiments, the I/O device may include a substrate, a protective layer, and an ink layer. The ink or display may be used to selectively modify the glyphs displayed on the I/O device and/or borders between discrete keys or buttons of the I/O device. The ink layer may be dynamically adjustable and as the ink layer varies, the input functionality of the I/O device may also be adjusted. In some embodiments, the ink layer may be electrophoretic or electronic ink (e-ink). In these embodiments, the ink layer may include one or more activation layers or components (e.g., electrode pairs) and a plurality of pigment capsules suspended between the activation layers. The pigment capsules may include a plurality of colored pigments suspended therein, such as black pigment particles and white pigment particles. Multiple pigment particles may be placed within each of the pigment capsules.

In embodiments including pigment capsules, the pigments suspended in the capsules may include a colorant that may be chosen to match the enclosure (or other desired appearance). In one example, the I/O device may match a metallic enclosure for an electronic device and the pigment capsules may include mica or other metallic looking particles, in addition to or in place of the black and white pigment particles. Similarly, the pigment capsules may include reflective particles (either as part of the pigment particles or separate therefrom). The reflective particles may reflect light in a manner that match, duplicate or come close to the light reflectance of the enclosure. In another example, the pigment capsules may include clear particles that may allow the substrate to be visible therethrough. As yet another example, the size and/or density of the capsules may be selected to replicate or substantially match the pattern or texture of a material forming the enclosure or other portion of the electronic device.

In some embodiments, the substrate and/or the protective layer sandwiching the ink layer may be modified to vary the appearance of the I/O device. In a first example, the substrate may be perforated (e.g., micro-perforated) to allow light to be transmitted through the substrate and illuminate the ink layer through a bottom of the ink layer. Varying light transmitted through the ink layer may vary the appearance of the ink layer as viewed through the protective layer by a user. In a second example, the substrate may be treated, painted, otherwise configured to match the appearance of the enclosure (or other desired appearance) or may be the same material as the enclosure. In this example, a shutter effect may be applied to the pigment particles to pull the different particles to opposing sides of the capsules, which may allow the substrate to be viewable through the ink layer. Alternatively, the ink layer may be otherwise modified, and may allow portions of the substrate to be viewable therethrough. In a third example the substrate may be textured, non-planar (e.g., curved), or the like. The ink layer may be connected to the substrate and may conform to the shape of the substrate, which may modify the appearance of the I/O device.

In some embodiments, the protective layer may be modified to vary the appearance of the I/O device. In a first example, the protective layer or a film between the protective layer and the ink layer may be faceted, textured, or the like to mimic or replicate light reflecting properties of the enclosure or to create desired reflecting properties for the I/O device. In a second example, the protective layer or film may include particular light transmission properties that may affect the appearance of the I/O device. In a specific example, the protective layer (or an intermediate layer) may include a collimated glass or other collimator. In this example, the image at the outer surface of the I/O device is not only visible through the glass, but the image (e.g., ink layer) may appear to lie essentially at the display interface. In a third example, the protective layer or an intermediate layer may include one or more embedded particles or colorants that may match the enclosure.

The I/O device may also be used as part of a display for the electronic device and/or a transition between a display and the enclosure. For example, the ink layer may be positioned on top of a portion of a display screen and may surround an edge of the display. The appearance of the I/O device may be configured to match the enclosure, but have display qualities (e.g., displaying visual output) and may form a soft transition between the enclosure and the display.

The I/O device may also be used to transmit radio signals and/or mask one or more components of the electronic device. For example, an antenna component may extend beneath a portion of the I/O device and may transmit radio signals through the ink layer and other layers.

The I/O device may be configured so that in the deactivated state, the ink layer may be set to match a desired pattern. For example, while off, the pigment particles may set to display a pattern or color that may match the enclosure of the electronic device. The I/O device may also be configured to transition between the dynamically adjustable keys in a manner that may be aesthetically pleasing or may visually draw attention. For example, as the I/O device transitions from a first displayed glyph to a second displayed glyph, the ink layer may "sparkle." In other words, the pigment particles within each of the capsules may be randomly activated to display a flurry of alternating colors, which may create a "sparkling" appearance.

Other transitions between glyphs are also envisioned. As a first example, to change the symbol or glyph displayed or to otherwise refresh the display, a random selection of pixels may refresh with a time delay between each refreshing pixel. In this example, no two adjacent pixels may be simultaneously refreshing. As a second example, a spacing distance may be selected between refreshing pixels. In this manner, the refreshing pixels may be less noticeable to a user. As a third example, the refreshing pixels may be selected based on the color of the surrounding pixels. In this example, pixels in a relatively low color density may be selected to refresh first, as they may be less obvious to a user as they change to display the new glyph. As a fourth example, a pixel refresh may be embedded within a dynamic transition. In this example, as a portion of the keyboard is transitioning a second part of the keyboard can be refreshed (e.g., other pixels in the keyboard that may not need to be changed during the transition).

In some embodiments, techniques and structures that may implemented in the I/O device may be used to create an aesthetic element for the electronic device. As one example, the ink layer of the I/O device, when modified to match a desired appearance, may form a graphic or aesthetic element for the electronic device, such as a trademark name or image. In this example the ink layer may not need to be powered, but instead the pigment capsules may be set in a particular pattern by using an external stimulating source, such as an electrically charged wand or the like. As another example, using the techniques described herein, the ink layer may be configured to selectively display a graphic, image, or color display on the substrate beneath. This may be incorporated as part of the I/O device, or as a separate display or aesthetic element.

Particular Embodiments

An illustrative I/O device will now be discussed in more detail. FIG. 1 is a perspective view of a computing device incorporating the I/O device. With reference to FIG. 1, the computing device 100 may include the I/O device 102, an enclosure 106 at least partially surrounding the I/O device 102, a keyboard 104, and/or a display 108. The border of the I/O device 102 is illustrated by dashed lines in FIG. 1. In some embodiments, as discussed in more detail below, the I/O device 102 may be configured to be inconspicuous with the enclosure or other portions of the computing device. This may allow the computing device and the I/O device to have a substantially uniform and seamless appearance. In other embodiments, the I/O device may have a visible border, such as a raised or recessed element or a different colored perimeter to indicate the transition between the enclosure and the I/O device.

The computing device 100 may be substantially any type of computer or electronic device, such as, but not limited to, a desktop, a laptop, a tablet, a portable gaming device, and/or a mobile computing device (e.g., a smart phone). Based on the configuration of the computing device 100 one or more elements as illustrated in FIG. 1 may be omitted. As one example, in instances where the computing device is a tablet, the keyboard 104 may be omitted. In the example shown in FIG. 1, the computing device 100 is a laptop computer including a base or bottom portion operably connected to the keyboard 104 and a display or upper portion operably connected to the display 108. The two portions may be rotatably connected to each other.

The I/O device 102 is configured to receive user input to the computing device 100, as well as output information to the user. In many implementations, the I/O device 102 may vary the input and/or output based on one or more parameters (e.g., a program executing on the electronic device, a previous input to the computing device, the device's environment, and the like). In other words, the I/O device 102 may be dynamically reconfigurable. With reference to FIG. 1, the I/O device 102 may be positioned at a top end of the keyboard 104 adjacent to the connection interface between the bottom portion of the computing device 100 and the top portion of the computing device 100. For example, the I/O device 102 may be positioned at a forehead area of the bottom portion of the computing device 100 adjacent to a bottom end of the display 108 when the computing device 100 in an open configuration.

Figure 2A:
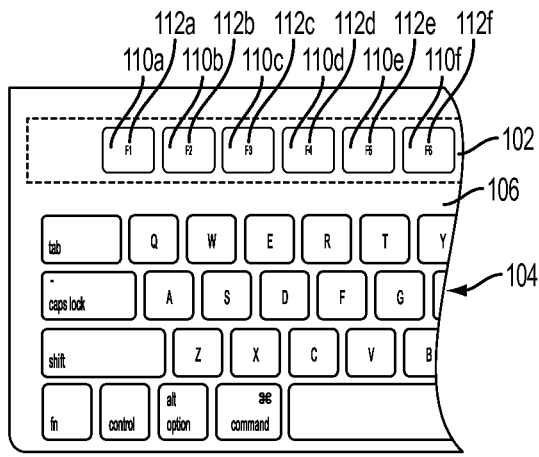
FIG. 2A is an enlarged top plan view of the sample I/O device in a first configuration.

The I/O device 102 may be shaped as a generally elongated bar extending across a portion of a length or width of the enclosure 106. In some embodiments, the I/O device 102 may be comprised of discrete display areas (e.g., keys); however, in many embodiments, the I/O device 102 may form a single key or display area, which may be dynamically reconfigurable into discrete keys or buttons. FIG. 2A is an enlarged top plan view of the I/O device 102 in a first configuration. As shown in FIG. 2A, the I/O device 102 may be divided into a plurality of keys or separate input areas 110*a*-110*f* and each key 110*a*-110*f* may display a glyph 112*a*-112*f* or other symbol. The separate glyphs 112*a*-112*f*, as well as the divisions between each key 110*a*-110*f* may be static (e.g., etched or otherwise incorporated into the material forming the I/O device 102), or may be dynamic (e.g., may be illuminated or projected onto the material forming the I/O device 102). The shape of the I/O device may vary in alternative embodiments, and need not be rectangular.

Figure 2B:
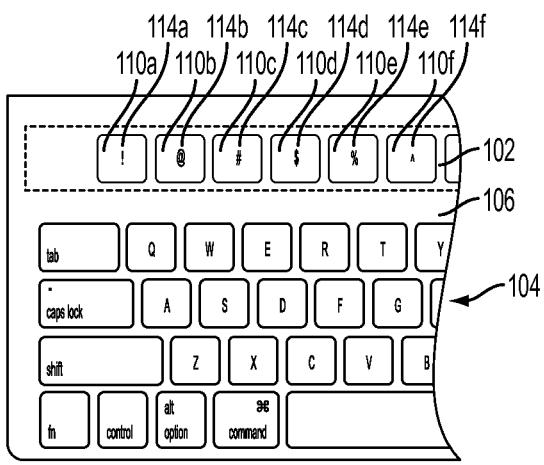
FIG. 2B is an enlarged view of the sample I/O device with a second set of glyphs displayed.

The appearance of the top surface of the I/O device 102 may be varied to change the glyphs 112*a*-112*f* and/or to vary one or more viewing characteristics (e.g., contrast, brightness, hue), of the glyphs and/or display area. FIG. 2B is an enlarged view of the I/O device 102 with a second set of glyphs 114*a*-114*f* displayed. In FIG. 2B, the first set of glyphs 112*a*-112*f* may either be "erased" or otherwise not displayed, or may be hidden by the illumination or other display characteristics of the second glyphs 114*a*-114*f*.

Figure 2C:
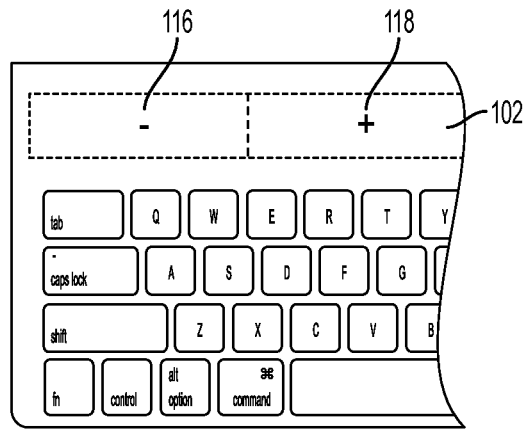
FIG. 2C is an enlarged view of the sample I/O device including a first key and a second key.

In addition to the glyphs, the I/O device 102 may also change one or more input areas or key areas. FIG. 2C is an enlarged view of the I/O device 102 including a first key 116 and a second key 118. In this example, the number of keys or input surfaces may be reduced as compared to FIG. 2A; however, the size of the input surfaces for each key 116, 118 may be increased. In this example, the glyphs may correspondingly change or may be eliminated. In this implementation, the keys 116, 118 may be used as separate inputs, or may be provide a single input. In one implementation, a user may slide his or her finger across the entire length, and an input force close to the edge of the first key 116 may provide one input and an input force close to the middle of the keys 116, 118 may provide another input. It should be noted that in addition to changing the division of the I/O device 102 input areas and the appearance of the glyphs, the external appearance of the I/O device 102 may be configured to match one or more elements of the computing device 100 to enhance one or more viewing characteristics of the I/O device.

Figure 3:
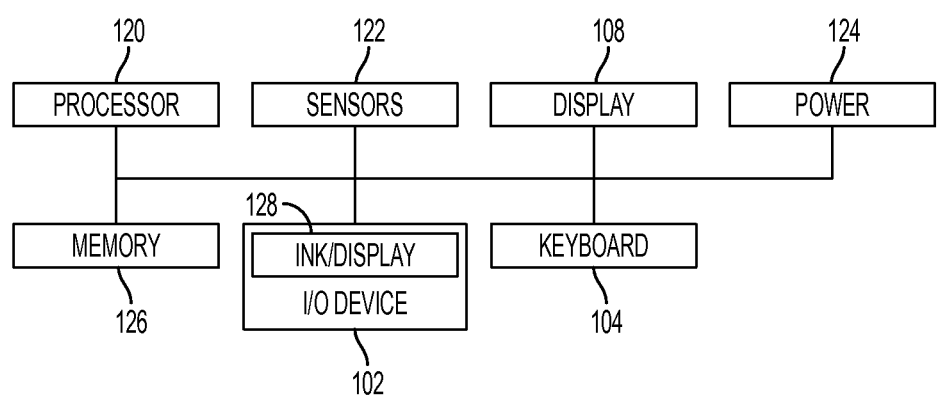
FIG. 3 is a simplified block diagram of the computing device of FIG. 1.

The I/O device 102 may be in communication with a number of components of the computing device 100 and may vary the displayed glyphs and/or key areas based on communication with the computing device 100 and/or sensed inputs. FIG. 3 is a simplified block diagram of a the computing device 100. As shown in FIG. 3, the computing device 100 may include a processor 120, one or more sensors 122, a power source 124, and/or one or more memory components 126. The components of the computing device 100 may be in communication with one another through one or more system buses, printed circuit board traces, wireless signals, or the like.

The processor 120 may be substantially any electronic device cable of processing, receiving, and/or transmitting instructions. For example, the processor 120 may be a microprocessor or a microcomputer. Additionally, it should be noted that the processor 120 may include more than one processing member. For example, select components of the computing device 100 may be controlled by a first processor and other components of the electronic device 100 may be controlled by a second processor, where the first and second processors may or may not be in communication with each other. Continuing with this example, one processor may be included as part of the I/O device to control one or more components thereof, whereas a second processor may control aspects of the computing device 100.

The memory 126 may store electronic data that may be utilized by the electronic device 100. For example, the memory 126 may store electrical data or content e.g., audio files, video files, document files, and so on, corresponding to various applications. The memory 126 may be, for example, non-volatile storage, a magnetic storage medium, optical storage medium, magneto-optical storage medium, read only memory, random access memory, erasable programmable memory, flash memory, or a combination of one or more types of memory components.

The computing device 100 may also include one or more sensors 122. The sensors 122 may be incorporated into the I/O device 102 and/or may be in communication therewith. For example, the I/O device 102 may include one or more capacitive sensors, force sensors, or the like that may detect inputs to the I/O device 102 from a user. As another example, the computing device 100 may include one or more accelerometers, image sensors, gyroscopes, or the like that may be used to sense inputs that may vary the visual output of the I/O device 102. Continuing with this example, when the computing device 100 is in a certain position (as detected by one or more gyroscopes or accelerometers), the I/O device 102 may display a first set of glyphs and may have a first set of keys that may be altered with the computing device 100 is moved to a second position.

The computing device 100 may also include a power supply 124 to provide power to the I/O device 102, processor 120, display 108, and other components. The power supply 124 may include one or more batteries (e.g., lithium ion batteries), a cable to communicatively couple the computing device 100 to an external power supply (e.g., wall outlet), or the like.

With continued reference to FIG. 3, the I/O device 102 may include an ink 128 or display that provides a visual output to the user. As discussed above with respect to FIGS. 2A-2C, the visual output provided by the ink 128 may be dynamically variable. However, in other embodiments, (see, e.g., FIG. 23), the visual output may be static. The I/O device 102 and the ink 128 may be in communication with the processor 120 and one or more of the sensors 122.

Figure 4:
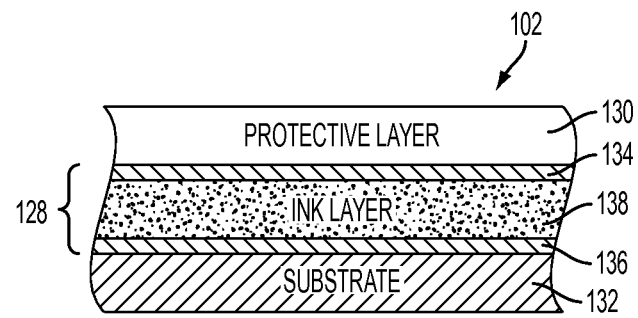
FIG. 4 is a simplified cross-section view of the sample I/O device taken along line 4-4 in FIG. 1.
Figure 5:
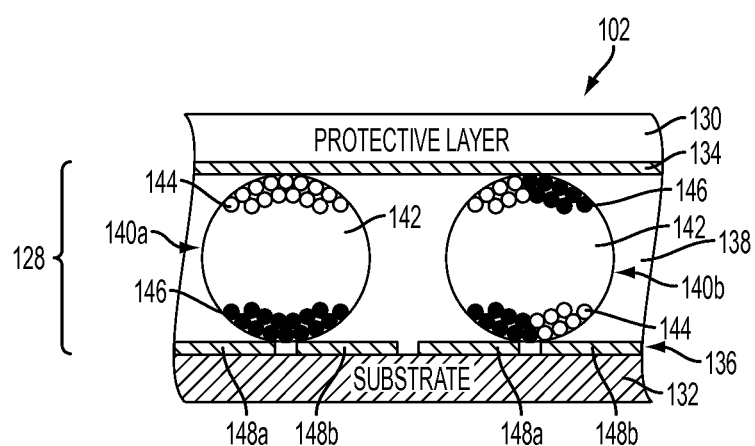
FIG. 5 is an enlarged, simplified view of a portion of the cross-section view of FIG. 4.

Illustrative examples of the structure and components of the I/O device 102 will now be discussed in more detail. FIG. 4 is a simplified cross-section view of the I/O device 102 taken along line 4-4 in FIG. 1. FIG. 5 is an enlarged simplified view of the cross-section view of FIG. 4. With reference to FIGS. 4 and 5, the I/O device 102 may include a protective layer 130, the ink 128, and a substrate 132 or other support.

The protective layer 130 may be a transparent material, such as glass or clear plastic, and may include one or more films, treatments, or coatings (not shown). The protective layer 130 may form an outer visible surface of the I/O device 102 and may allow the I/O device 102 to be substantially flush (if desired) with the enclosure 106, or may otherwise be recessed from or raised above the enclosure 106. In some embodiments, the protective layer 130 may include one or more capacitive sensors, such as a multi-touch active matrix, that may sense capacitance changes due to user touches or inputs. In other embodiments, a touch-sensitive array, matrix or layer may be defined beneath the ink 128. As will be discussed in more detail below, the protective layer 130 may also include one or more pigments, colorants, textures, or reflective or light transmissive properties that may cooperate to create a desired visual appearance for the I/O device 102.

The substrate 132 forms a supporting surface for the I/O device 102 and connects the I/O device 102 to the computing device 100. In some embodiments, the substrate may be communicatively coupled to one or more components of the computer device 100. Additionally, similarly to the protective layer 130, the substrate may be colored, treated, painted, textured, or the like to affect the visual appearance of the I/O device 102.

The ink structure 128 or display may be sandwiched between the substrate 132 and the protective layer 130. In some embodiments, the ink 128 may be an electrophoretic or an electronic ink (e-ink). With reference to FIG. 5, in embodiments where the ink structure 128 incorporates an e-ink, the ink structure 128 may include an ink layer 138 bounded by two activation layers 134, 136. The ink layer 138 may include a plurality of pigment capsules 140a, 140b suspended between the activation layers 134, 136. Each pigment capsule 140a, 140b includes a plurality of pigment particles 144, 146 suspended in a fluid 142. In some embodiments, the pigment capsules may be spheres that are sandwiched between the layers (substrate and the protective layer).

In other embodiments, the capsules may be defined as pockets or "cups" formed in a support material. In these examples, walls or barriers may be formed on a sheet of the support material and the pigment particles and fluid may be deposited therein. The walls or barriers, along with a top sealing layer, may enclose each pocket to form the "capsules." In these embodiments, all of the capsules within the ink layer or a portion thereof may be interconnected through the defined pockets within the support material. The support material and the sealing material or layer may be flexible and allow the ink structure 128 to be flexed or bent, without damaging the capsules or allowing the fluid and pigment particles to leak out. In embodiments including capsules defined in pockets, the barriers or walls may separate adjacent capsules from each other, whereas in other embodiments, the capsules may be spatially separated from each other, but there may not be structures positioned therebetween.

In some embodiments, the pigment particles 144, 146 may be differently colored from each other, e.g., a set of white pigment particles 144 and set of black or dark pigment particles 146. In these embodiments, the fluid 142 may be a clear fluid. However, in other embodiments, the pigment particles 144, 146 may be substantially the same color and the fluid 142 may be a non-clear color, that may be different from a color of the pigment particles 144, 146.

Each of the pigment capsules 140a, 140b may form a pixel of the I/O device 102. Additionally, each pigment capsules 140a, 140b may be individually activated by the activation layers 134, 136. In some embodiments, the top activation layer 134 may be an electrode layer and may be transparent (e.g., indium tin oxide). The bottom activation layer 136 may include a plurality of bottom electrodes 148a, 148b. In some embodiments, each pixel or each pigment capsule 140a, 140b may be in communication two or more bottom electrodes 148a, 148b. The activation layers 134, 136 may apply an electric field to the capsules 140a, 140b and depending on whether the electric field is positive or negative, the pigment particles 144, 146 may move to a select side of the pigment capsules 140a, 140b. This is possible as the pigment particles 144, 146 may be positively or negatively charged. In instances, where there may be two types or two or more colors of pigment particles, the first pigment particles 144 may be positively charged whereas with the second pigment particles 146 may be negatively charged.

As an example, with reference to FIG. 5, both the bottom electrodes 148a, 148b in communication with the first pigment capsule 140a may be negatively charged and the first pigment particles 144 (which may be positively charged) may move to the top of the pigment capsule 140a opposite the negative charge, whereas the second pigment particles 146 (which may be negatively charged) may move to the bottom of the pigment capsule 140a. In the embodiment illustrated in FIG. 5, with this electric field, the pigment capsule 140a may display the pigment color in the first pigment particles 144 that are at the top of the capsules 140a, i.e., a white color. To switch the displayed color, the electric field may be modified such that the second or negatively charged pigment particles 146 may migrate towards the top of the pigment capsule 140a. In this state, the pigment capsule 140a (when viewed from the top) may appear black (or the color of the second pigment particles 146).

As another example, with continued reference to FIG. 5, in some embodiments, both sets of pigment particles 144, 146 may be viewable through a top of the pigment capsules 140a, 140b. To create this visual appearance, the first bottom electrode 148a may be negatively charged whereas the second bottom electrode 148b may be positively charged. In this implementation, as shown in the second pigment capsule 140b in FIG. 5, the portion of the capsule 140b aligned with the first bottom electrode 148a may be colored with the pigments of the first pigment capsules 144 and the portion of the capsule 140b aligned with the second bottom electrode 148b may be colored with the pigments of the second pigment particles 146. In other words, half the pigment capsule 140b may be a first color and the other half of the pigment capsule may be a second color.

Figure 6:
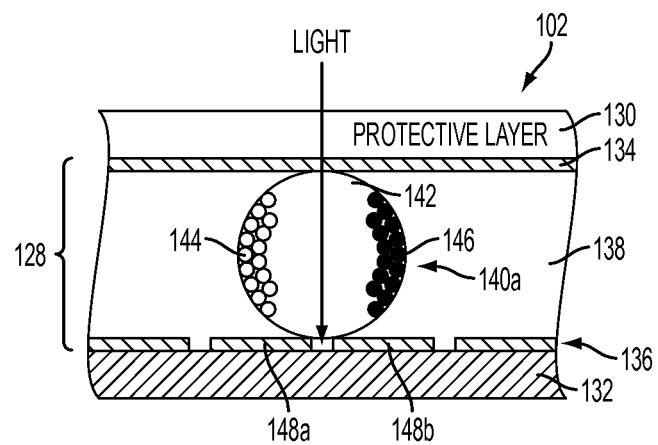
FIG. 6 is an enlarged, simplified cross-section view of the sample I/O device operating during a "shutter mode" operation.

With reference to FIG. 6, in some embodiments, the ink structure 128 may implement a shutter mode. During shutter mode, the activation layers 134, 136 may be modified to apply an electric field that causes the pigment particles 144, 146 to move to the sides of the capsules 140a, 140b rather than the top or bottoms of the capsules 140a, 140b. In this implementation, with the pigment particles 144, 146 positioned on either side of the capsules 140a, 140b the capsules 140a, 140b may appear to a user the color of the fluid 142 and/or the substrate 132 or bottom activate layer 136 may be visible. As will be discussed in more detail below, the shutter function may allow the substrate to vary the appearance of the I/O device 102.

The shutter mode may be activated by activating a lateral electric field across the ink structure 128. The electrodes applying the electric field may be in plane with either the substrate 132 and/or the protective layer 130. As another example, the activation layers may include one or more vertical conductive structures positioned in the ink structure 128. The vertical conductive structures may provide a more uniform electric field across the lateral direction of the ink structure 128.

In other embodiments, the shutter mode may be activated using hydrodynamic forces or flow forces. For example, flow forces within each of the capsules 140a, 140b may be used to cause the pigment particles to migrate or flow preferentially to select sides of the capsules. In this example, the electric field may be placed across the ink structure thickness (e.g., by using the activation layers 134, 136). The flow forces may be implemented using an alternating current electric signal at a predetermined frequency. This is possible as different frequencies may induce varying flow patterns, so varying the frequency can vary the flow pattern of the pigment particles.

Alternatively, a short pulse of high voltage (direct current or alternating current) can be used to induce a transient flow of the pigment particles that can cause the pigment particles to move to select sides of the capsules. After the shutter mode has been activated, the particles 144, 146 may be re-dispersed using a different set of alternating or direct current signals.

In some embodiments, the ink 138 may include pigment particles of only one color when activating shutter mode (discussed in more detail below). In this example, the user may be able to see the substrate 132 during shutter mode or the select color of the pigment particles. In other words, in these embodiments, the pigment particles may have a similar charge and therefore all of the pigments contained within the capsules (or a substantial portion thereof) may move towards the same edge or side of the capsules during shutter mode. Alternatively, during a non-shutter mode operation, the color displayed by capsules may be the color of all of the pigment particles.

With reference to FIG. 6, it should be noted that although FIG. 6 illustrates a shutter mode that causes the differently charged or colored pigments to migrate to opposite sides of the capsules 140a, 140b, other embodiments are also envisioned. For example, during shutter mode, the pigment particles 144, 146 may migrate to the edge of the capsules 140a, 140b together (e.g., towards the same side of the capsules). In this example, all of the pigment particles 144, 146 (or an intermixed portion thereof), may travel to the same side of the capsules 140a, 140b regardless of their pigment color.

Pigment Particles

Figure 7:
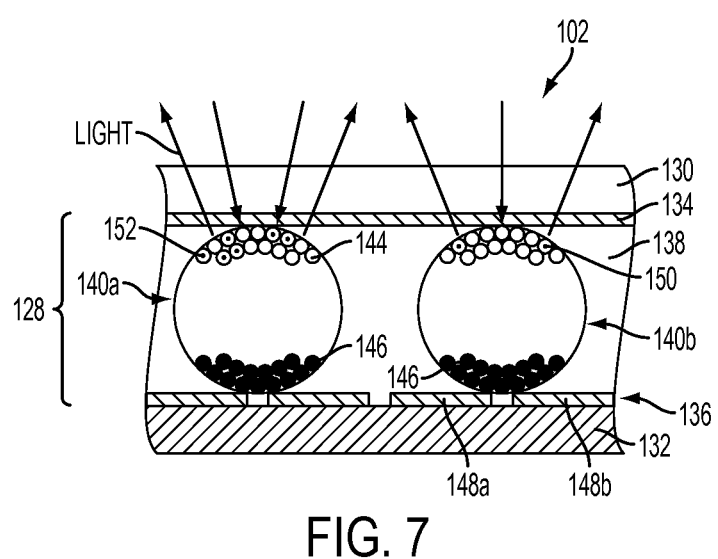
FIG. 7 is a cross-section view of the sample I/O device, showing light reflecting particles suspended within the pigment capsules.

In some embodiments, the pigment particles 144, 146 within the ink structure 128 may be modified to vary the visual appearance of the I/O device 102. FIG. 7 is a cross-section view of the I/O device 102 including light reflective particles 150, 152. The light reflective particles 150, 152 may include a pigment that may be the same or substantially similar to one of the pigment particles 144, 146, e.g., they may be colored with white or black pigments. Alternatively or additionally, the reflective particles 150, 152 may be different color than the pigment particles 144, 146 or may not be colored. As one example, the light reflective particles may be particles of mica or another reflective mineral, mirrored glass, or the like.

The light reflective particles 150, 152 may be positively or negatively charged. In this example, the light reflective particles 150, 152, if charged, will move with the corresponding pigment particles 144, 146 as activated by the activation layers 134, 136. In some embodiments, the ink layer may include only one type of charged light reflective particles 150, 152, e.g., all the light reflective particles 150, 152 may only have a single type of charge. In other examples, the light reflective particles 150, 152 may not be charged. In this example, the light reflective particles 150, 152 may be randomly distributed within the pigment capsules 140a, 140b. As yet another example, the pigment capsules 140a, 140b may include a mixture of charged and uncharged reflective particles 150, 152.

With reference to FIG. 7, as light enters into the I/O device 102 and through the protective layer 130, the light be reflected off of the light reflective particles 150, 152. The light reflective particles 150, 152 may be selected to have one or more light reflectance properties that match or are similar to the material of the enclosure of the device 106. In this manner, the I/O device 102 may have a similar or matching light reflectance to the enclosure, which may increase the visibility of the I/O device 102 in certain lighting conditions.

In another example, the pigment particles 144, 146 and/or the light reflective particles 150, 152 may include a pigment that is visible under light other than white light (such as a black light, infrared light, ultraviolet light, and so on). For example, the pigment particles 144, 146 and/or the light reflective particles 150, 152 may include fluorescent pigments. This may allow the I/O device 102, and specifically, the glyphs displayed by the I/O device 102, to be better visible in a number of different lighting environments.

Figure 8:
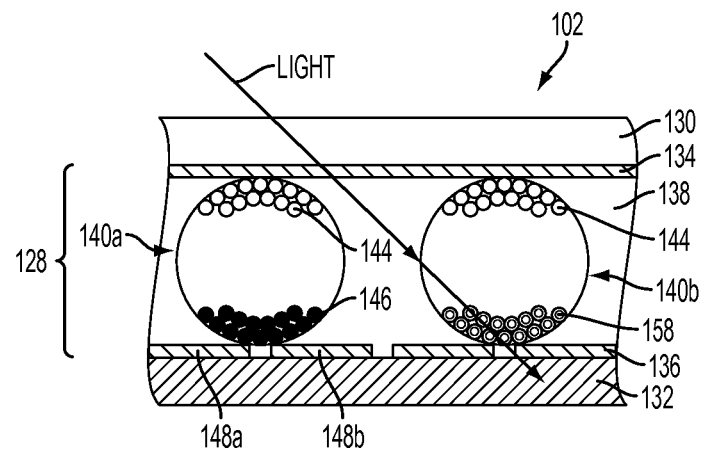
FIG. 8A is a cross-section view of the sample I/O device, showing transparent particles suspended in the pigment capsules.
FIG. 8B is a cross-section view of the sample I/O device, showing a plurality of translucent capsules in addition to the pigment capsules.

In some embodiments, a plurality of the pigment particles 144, 146 may be translucent. FIG. 8A is a cross-section view of the I/O device 102 including transparent particles. With reference to FIG. 8A, the second capsule 140b may include the transparent particles 158 in lieu of or in addition to the second pigment particles 146. Depending on the spacing between each of the pigment capsules 140a, 140b, in some instances, the transparent particles 158 may allow a portion of the substrate 132 and/or bottom activation layer 136 to be visible from the outer surface of the I/O device 102. This may enhance the visibility of the pigmented particles 144, 146 as the substrate may be colored to match the enclosure material and the colored pigment particles may stand out better against that particular color.

The transparent particles 158 may be intermixed with the pigment particles 144, 146 so that the transmissivity of the capsules 140a, 140b overall may be enhanced. This may allow objects underneath the ink structure 128 to be visible (or partially visible) through the ink structure 128. Additionally, in some embodiments, every other capsule 140a, 140b (or other variations of groups of capsules) may include transparent particles 158. In some embodiments some of the capsules may include only transparent particles 158 and no pigment particles.

It should be noted that the light reflective particles 150, 152 and/or the pigment particles 144, 146 may have pigments or colorants that may be selected to substantially match the color or pattern of the enclosure 106. For example, in some instances, the enclosure 106 may be anodized aluminum and in these instances, one or more of the particles may be selected to be mica, aluminum, or the like that may substantially match the anodized aluminum.

In other embodiments, the ink structure 128 may include a plurality of translucent capsules. FIG. 8B is a cross-section view of the I/O device 102 including a plurality of translucent capsules 190a, 190b. The translucent capsules 190a, 190b may be interspersed with the pigment capsules 140a, 104b. The translucent capsules 190a, 190b may include the fluid 142 suspended therein, but may not include any pigment particles or the pigment particles may also be translucent. The translucent capsules 190a, 190b may be mixed with the pigment capsules 140a, 140b to increase the transmissivity of the I/O device 102.

Figure 9:
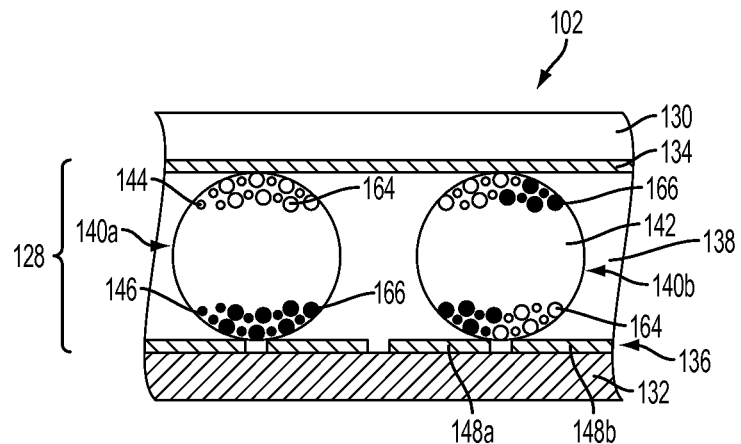
FIG. 9 is a cross-section view of the sample I/O device, showing pigment particles of varying diameters.

In some embodiments, the size, density, and/or shape of the pigment particles 144, 146 may be modified to create a desired visual appearance of the I/O device 102. FIG. 9 is a cross-section view of the I/O device 102 including pigment particles of varying diameters. With reference to FIG. 9, the capsules 140a, 140b may include differently sized pigment particles 164, 166 that may be larger or smaller than the pigment particles 144, 146. As shown in FIG. 9, the capsules 140, 140b, may include large pigment particles 164, 166 mixed with the pigment particles. The mixture of differently sized particles 144, 146, 164, 166 may vary the pattern and the visual appearance of the ink structure 128. This may allow the ink structure 128 to have an increased viewability in a variety of lighting conditions. In some embodiments, the ratio of small, medium, and large pigment particles may be selected to match the appearance of the enclosure 106 or other portion of the electronic device 100. This may create a uniform appearance for the I/O device 102 and the electronic device 100.

It should be noted that although FIG. 9 illustrates only a mix of larger particles 164, 166 and normal sized particles 144, 146, other mixtures are envisioned. For example, the capsules 140a, 140b may include a plurality of sizes, e.g., more than three different diameters. Additionally, the shape, diameter, or the like of the capsules may be varied to match a desired pattern or texture appearance and/or to allow the substrate 132 to be partially visible through the ink structure 128. Moreover, in some embodiments, only one of the negatively or positively charged pigment particles may include variable sizes.

As another example, the density of the pigment particles suspended in the pigment capsules may be increased or decreased to match a pattern, texture, and/or color of the enclosure.

Variations to the Substrate

In some embodiments it may be desirable to vary one or more characteristics on the substrate 132 to modify the appearance of the I/O device 102. With reference again to FIG. 6, in some embodiments, the substrate 132 may be colored, patterned, or include an image. As shown in FIG. 6, the substrate 132 may be colored with one or more colors. Coloring or patterning the substrate 132 may change the visual appearance of the ink structure 128 and the I/O device 102. For example, during shutter mode when the pigment particles 144, 146 are pulled to the sides of the capsules 140a, 140b, the substrate 132 may be visible through the ink structure 128. In instances where the substrate 132 is colored, the color of the substrate may provide additional contrast to the ink in the structure 128. Additionally, the substrate 132 color may further blend the I/O device 102 with the enclosure 106 or other portions of the electronic device 100. For example, the substrate 132 may be the same material as the enclosure 106 or may be colored to match the color of the enclosure 106, which may provide a uniform appearance.

With continued reference to FIG. 6, using the shutter mode, one or more images or graphics on the substrate 132 may be made visible. This may functionally provide another visible glyph for the I/O device 102. The glyph or graphic on the substrate 132 may have a different color or appearance from the glyphs provided by the ink layer 138, and thus may increase the number of options of the dynamically variable images capable of being displayed by the device 102.

Figure 10A:
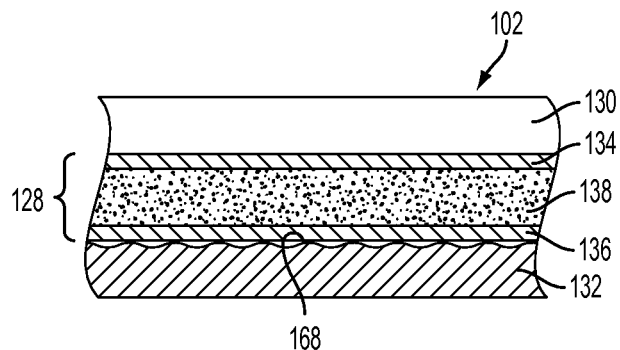
FIG. 10A is a simplified cross-section view of the sample I/O device with a textured substrate.

In other embodiments, the substrate 132 may be textured; for example, it may be rough. FIG. 10A is a simplified cross-section view of the I/O device 102 having a textured substrate. With reference to FIG. 10A, the substrate 132 may include a textured upper surface 168. The textured upper surface 168 may interface with the ink structure 128. The ink layer 138 may be applied to the substrate 132 and conform to the textured surface 168. As the ink layer 138 conforms to the ridges, bumps, and other textures, the appearance of the I/O device 102 may be varied and may enhance the contrast of the I/O device 102.

The pattern or texture of the surface 168 of the substrate 132 may be configured to create an appearance of the I/O device 102 that may at least partially match the appearance of the enclosure 106 of the computing device 100. In other embodiments, the surface 168 may be configured to match another material that may distinguish the I/O device 102 from the enclosure 106. In this manner, during a non-shutter mode, the I/O device 102 may have an appearance that blends with the enclosure 106 and then during shutter mode, the I/O device 102 may stand out from the enclosure 106 and have contrast therewith.

It should be noted that the variations to the substrate 132 may be implemented on the substrate itself or may be a film, coating, or laminate positioned thereon. For example, a textured film may be applied to surface of the substrate to create the textured substrate.

Figure 10B:
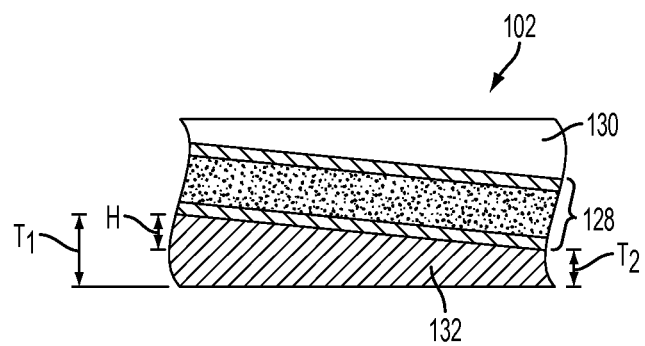
FIG. 10B is a cross-section view of the sample I/O device including a substrate having a varying thickness.

In some embodiments, the substrate 132 may have a variable thickness. FIG. 10B is a cross-section view of the I/O device 102 including a substrate with a varying thickness. With reference to FIG. 10B, the substrate 132 may have thickness that varies across either the length or the width of the ink structure 128. The variable thickness may position the ink structure 128 at an angle, which may increase the contrast of glyphs displayed by the ink structure 128. For example, a first end of the substrate 132 may have a first thickness T1 and a second end of the substrate may have a second thickness T2, where the second thickness T2 is less than the first thickness T1.

The difference in thicknesses may be a height H, and the height H may determine the angle that the ink structure 128 may be positioned relative to a horizontal plane or surface. The angle may increase the light reflectance of the I/O device 102 in select directions, which may increase the contrast of the display of the I/O device 102 at certain viewing angles. Although the substrate is shown as having a varying thickness, in other embodiments, the substrate may include a film or coating that may create the varying thickness. See, for example, FIG. 14.

Figure 11:
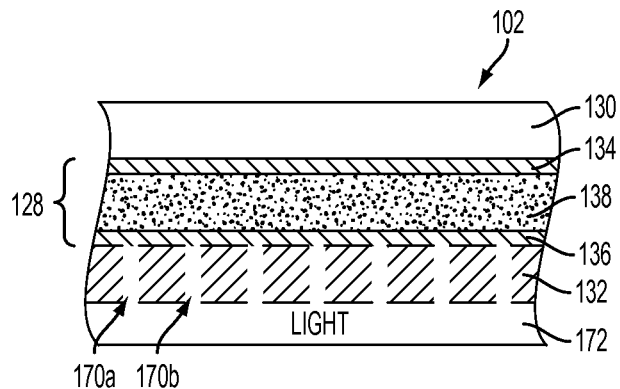
FIG. 11 is a cross-section view of the sample I/O device including a perforated substrate.

In yet other embodiments, the substrate 132 may include an increased light transmissivity. FIG. 11 is a cross-section view of the I/O device 102 including a perforated substrate 132. With reference to FIG. 11, the substrate 132 may be micro-perforated to include a variety of apertures 170a, 170b defined therethrough. The apertures 170a, 170b may be substantially any diameter. In some embodiments, the apertures 170a, 170b may have a sufficiently small diameter to provide support for the ink structure 128, while still allowing light to be transmitted through the substrate.

In the embodiment illustrated in FIG. 11, a light source 172 may be positioned on a bottom or back side of the substrate 132. The light source 172 may be activated and light rays may be transmitted through the apertures 170a, 170b. The light transmitted through the substrate 132 may alter the appearance of the I/O device 102 and may be used to display one or more glyphs or change the appearance of one of more glyphs. For example, the light source 172 may be a colored light and may "highlight" a particular glyph displayed by the ink structure 128. As another example, the light transmitted through the substrate 132 may create the appearance of light reflecting off the surface of the I/O device 102. This may allow the I/O device 102 to have a uniform appearance with the enclosure 106 or other element of the computing device 100 (e.g., the apertures and light source may be selected to match the light reflecting properties of the enclosure or other element of the computing device 100).

It should be noted that the substrate 132 to which the ink structure 128 is connected to may not only be textured, but may also be a non-flat surface. For example, the substrate may form a shape, have one or more angles or curves, or the like. In these embodiments, the shape of the I/O device 102 may be varied from a planar element to an element that may have a textured feel. For example, the I/O device 102 may include static button or key borders that may be defined by ridges in the I/O device 102 (e.g., the ridges in the substrate and ink as applied thereto). Additionally, the curvature, texture, or the like of the substrate may change the appearance, feel, and the like of the I/O device 102 or the ink layer 128.

Overlays and Films

Figure 12A:
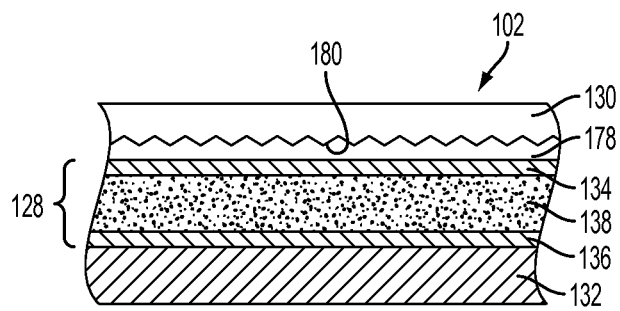
FIG. 12A is a cross-section view of the sample I/O device including a modifying film having a faceted surface.
Figure 12B:
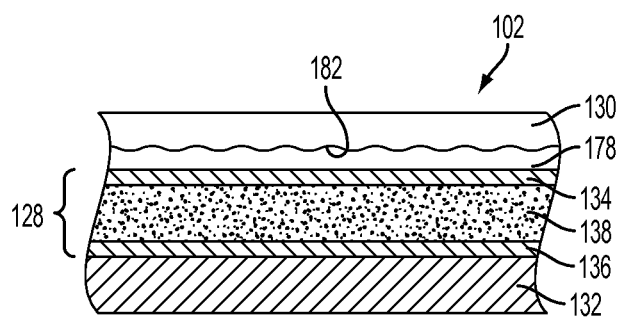
FIG. 12B is a cross-section view of the sample I/O device including a modifying film having an undulating surface.

In some embodiments, the I/O device 102 may include one or more coatings, overlays, films, or the like to improve the visibility of the glyphs or modify the appearance of the I/O device 102. FIGS. 12A and 12B illustrate a cross-section view of the I/O device 102 including a modifying film 178. With reference to FIGS. 12A and 12B, the modifying film 178 may be positioned between the ink structure 128 and the protective layer 130. In some embodiments, the modifying film 178 may be formed as a bottom surface of the protective layer 130 or may be positioned on top of the protective layer 130 or on the substrate 132.

The modifying film 178 may modify the appearance, either the pattern, color, or light properties of the ink structure 128. For example, as shown in FIG. 12A, the modifying film 178 may include a faceted surface including a plurality of facets 180. The facets 180 may terminate in ridges or apexes and each facet 180 may reflect light that enters into the I/O device 102 from the protective layer 130 back through the protective layer 130. The reflected light may enhance the contrast and/or visibility of the glyphs displayed by the ink structure 128. Additionally, as discussed above with respect to the substrate, the modified light reflectance may be configured to match a desired element, such as to match the light reflectance of the enclosure 106 in order to enhance one or more viewing characteristics of the I/O device.

As another example, with respect to FIG. 12B, the modifying film 178 may have undulations 182. The undulations 182 may, similar to the facets 180, act to change the reflectance of light from the I/O device 102. It should be noted that although the modifying film 178 has been illustrated as having a particular texture or pattern, many other patterns and textures are envisioned. For example, parallel ridges, grooves, or the like may be used to modify the characteristics of the I/O device 102.

Figure 13:
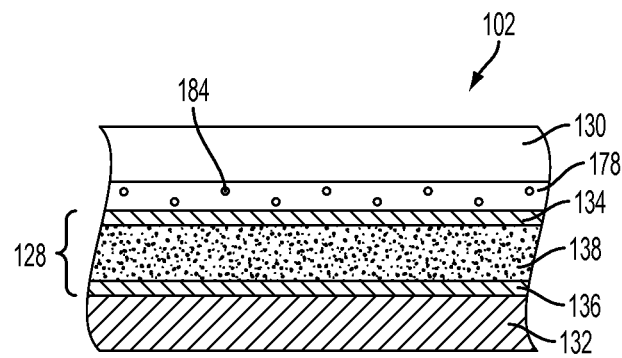
FIG. 13 is a cross-section view of the sample I/O device including a modifying film having flecks or pigments suspended therein.

In other embodiments, the modifying film 178 may include pigments, particles, or fragments positioned therein. FIG. 13 is a cross-section view of the I/O device 102 including a modifying film 178 having flecks 184 suspended therein. The flecks 184 may be pigments, colorants, or the like, that may vary the visual appearance of the I/O device 102. The density of the flecks 184 and the color of the flecks 184 may be selected to enhance the contrast of the glyphs of the I/O device or to decrease the contrast of the I/O device 102 with the enclosure 106 (e.g., to substantially match the enclosure 106). In some embodiments, the flecks 184 may be metallic particles that may match the color and/to pattern of the enclosure 106.

In some implementations, the flecks 184 may include mirrored particles or may otherwise have reflective properties. In these implementations, the flecks 184 may increase the amount of light transmitted/reflected from the I/O device 102, which may help improve one or more viewable characteristics in certain conditions.

Figure 14:
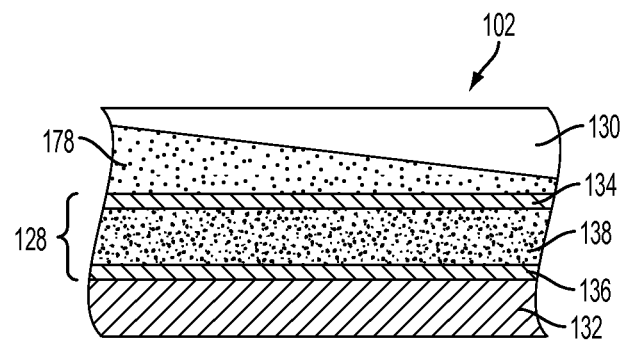
FIG. 14 is a simplified cross-section view of the sample I/O device including the modifying film having a variable thickness.

In some embodiments, the thickness of the modifying film 178 may be varied along a width or length of the I/O device 102. FIG. 14 is a simplified cross-section view of the I/O device 102 including the modifying film having a variable thickness. With reference to FIG. 14, the modifying film 178 may have a thickness that decreases from one end of the substrate towards the other. By varying the thickness of the film 178, the light reflecting properties of the film may also be varied, which may modify the light reflecting properties of the I/O device 102. Additionally, the variable thickness may act to change the pitch of the film 178 on the ink structure 128, i.e., change the angle that light hits certain portions of the film 178. It should be noted that the pitch of the film 178 may be varied in other manners, such as by increasing the thickness of the top activation layer 134, adding a support structure or layer between the film and the activation layer, or the like. By varying the pitch or thickness of the modifying film 178, the brightness of the displayed glyphs may be enhanced, especially at certain angles. For example, the modifying film 178 may be configured to have an enhanced brightness when viewed from a particular direction, such as when viewing the I/O device 102 from a front of the computing device 100.

The modifying film 178 may also include a reflective or shiny surface. For example, the modifying film 178, which can be positioned on either surface of the protective layer 130, may have a shiny or reflective surface. The shiny surface may enhance the contrast of the ink structure 128 and may enhance one or more viewing characteristics or viewing impression of the I/O device 102. As another example, the modifying film 178 may include a pattern (that may be transparent, opaque, or partially transparent). The pattern may be selected to provide a desired textured appearance to the I/O device 102 and/or the ink structure 128. As one example, the pattern may be selected to match the pattern on the enclosure 106 or other portion of the computing device 100, e.g., the pattern or appearance of the material used to form the enclosure 106.

Figure 15A:
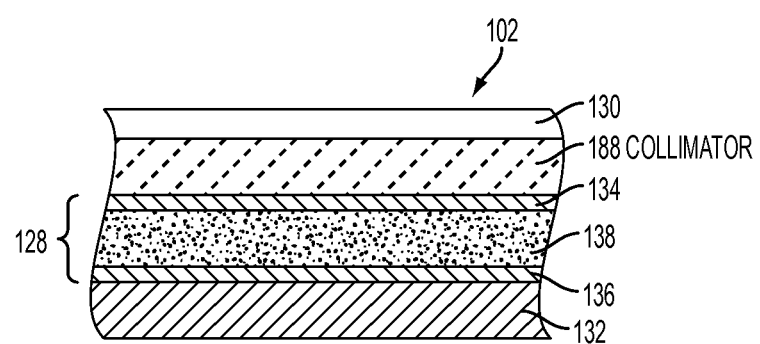
FIG. 15A is a cross-section view of the sample I/O device including a collimating component.
Figure 15B:
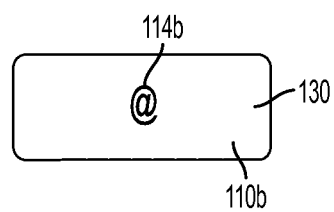
FIG. 15B is a top plan view of the sample I/O device of FIG. 15A having a key displaying a glyph.

In some embodiments, the I/O device 102 may include a collimating layer or component. FIG. 15A is a cross-section view of the I/O device including a collimating component 188. FIG. 15B is a top plan view of the I/O device of FIG. 15A having a key displaying a glyph. With reference to FIGS. 15A and 15B, the I/O device 102 may include a collimating component 188 positioned between the ink structure 128 and the protective layer 130. It should be noted that the collimating component 188 may be positioned on a top surface of the protective layer 130 or may form the protective layer 130 for the I/O device 102.

The collimating component 188 may translate the display provided by the ink layer 138 to have a different depth appearance. In other words, the display glyph 114b may appear to lie essentially at the outer surface of the collimating component 118, rather than at the ink layer. Depending on the position of the collimating component 188, the glyph 114b may appear to lie on the outer surface of the I/O device 102, which may enhance the contrast and the appearance of the display glyph. Additionally, the collimating component 188 may enlarge the glyph 114b, which may allow the glyph 114b to be more easily viewable from farther distances.

The collimating component 118 may be glass or another transparent material that collimates light waves as they pass therethrough. In some embodiments, the collimating component 118 may be a glass layer that forms the protective layer of the I/O device 102 and thus may also act as a defense layer for the ink structure 128, as well as enhance the appearance of the glyphs. The collimating component 118 may have a thickness ranging between 0.3 to 1 mm thick and in one embodiment 0.5 mm thick.

Lighting of the I/O Device

Figure 16:
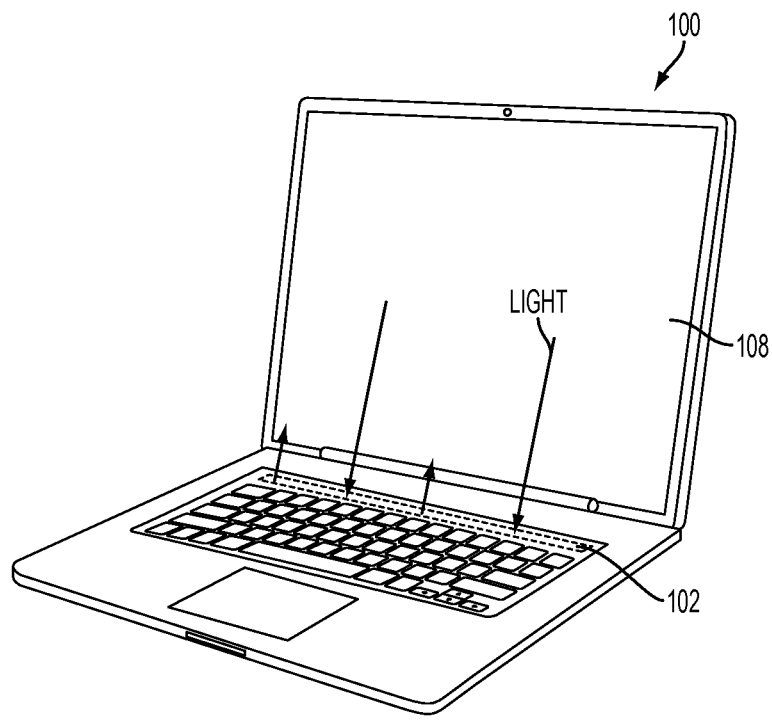
FIG. 16 is a side perspective view of the sample I/O device harvesting light from the display of the computing device.
Figure 17:
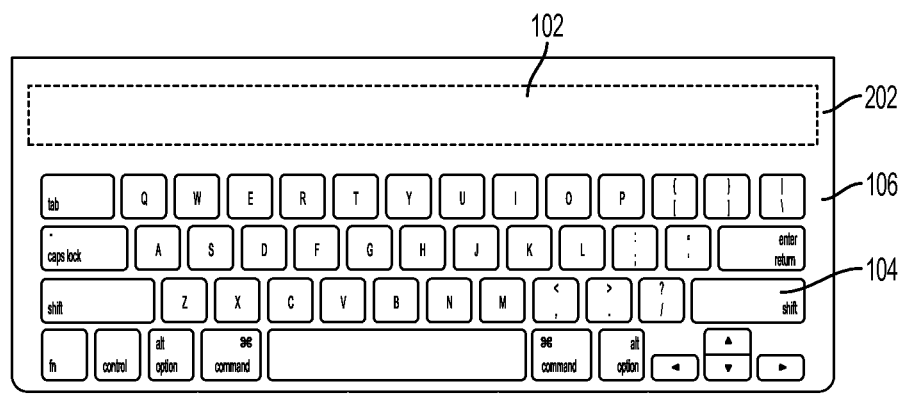
FIG. 17 is an enlarged top plan view of the example computing device illustrating edge lighting for the sample I/O device.

The I/O device 102 may be lit to increase the contrast, brightness, and other viewing characteristics. In some embodiments, the I/O device 102 may include its own lighting source and/or may use reflected light from another element. FIG. 16 is a side perspective view of I/O device harvesting light from the display of the computing device. FIG. 17 is an enlarged top plan view of the computing device illustrating edge lighting for the I/O device 102. As shown in FIG. 16, in some embodiments, the I/O device 102 may harvest light from the display 108 of the computing device. For example, the display 108 may be a liquid crystal (LCD) display, plasma screen display, or the like and may emit light as it provides a visual output for the computing device 100. The I/O device 102 may be positioned on the front surface of the bottom enclosure 106 to receive light transmitted from the display 108. As light waves are transmitted from the display 108 they may be absorbed by the I/O device 102 and then reflected therefrom.

As described above with respect to FIGS. 7, 10A, 12A, 12B, and 13, the I/O device 102 may include one or more elements that reflect light. For example, as light encounters the textured modifying film 178, the light may be reflected back through the protective layer 130. As another example, one or more of the light reflecting particles 150, 152 may reflect light that reaches the capsules 140a, 140b. As the light from the display is reflected back from the I/O device 102, the ink structure 128 and the glyphs displayed by the ink structure 128 may appear brighter and may be more easily read by a user. Additionally, by harvesting light from the display, the I/O device 102 may not need its own light source and may reuse light without requiring additional power consumption by the computing device 100.

With reference now to FIG. 17, in some embodiments, the I/O device 102 may include its own light source. An edge or perimeter light 202 may surround at least a portion of the I/O device 102. In some embodiments, the perimeter light 202 may surround the entire perimeter of the I/O device 102 and emit light that may increase the brightness of the I/O device 102. In some embodiments, the perimeter light 202 may surround the ink structure 128 and be positioned beneath the protective layer 130 to blend in with the I/O device 102. In other words, the perimeter light 202 may be configured to substantially blend with the I/O device 102 and provide a uniform appearance.

It should be noted that the edge light 202 may light only a portion of the I/O device 102. For example, the edge light 202 may be positioned on a front end of a forehead of the enclosure 106 (e.g., an area between the edge or hinge of the bottom enclosure and the upper enclosure supporting the display 108). In this embodiment, the edge light 202 may act as a front light to light the I/O device 102. In other embodiments, the edge light 202 may be positioned only on the sides of the of I/O device 102 or on the bottom of the I/O device 102. In other words, the edge light 202 may be configured based on the desired lighting for the I/O device 102.

With reference again to FIG. 11, the lighting techniques discussed above with reference to FIGS. 16 and 17 may be used in addition to the light source 172 in the I/O device 102 embodiment illustrated in FIG. 11. For example, the light source 172 may illuminate the I/O device 102 from beneath the substrate and the perimeter light 202 and/or the light harvesting techniques may be used to further reflect light around and through the I/O device 102. The combination of lighting sources may further increase the brightness of the I/O device 102, enhancing the user's ability to view the displayed glyphs and keys.

Glyph and Key Dynamic Transitions

Figure 18:
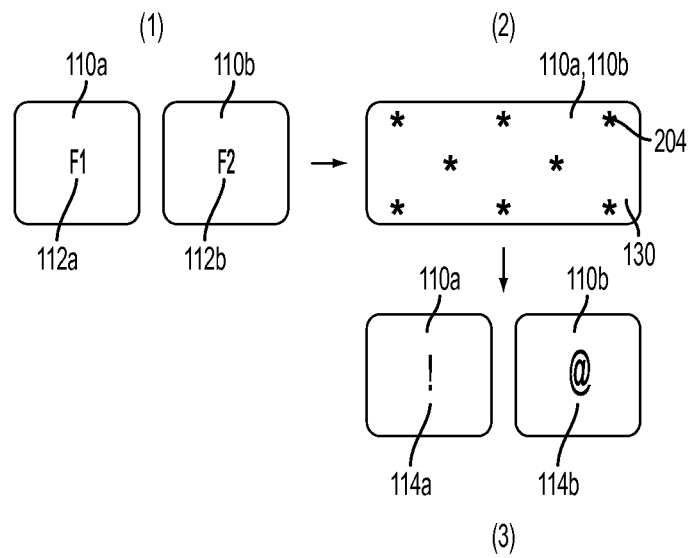
FIG. 18 is a diagram illustrating a portion of the sample I/O device as it transitions between a first set of displayed glyphs to a second set.

In some embodiments, the I/O device 102 may include transitions between dynamic changes to the size, shape, and/or glyphs displayed on the keyboard. For example, the I/O device 102 may flash, rapidly change pixel colors, change from black to white (or other colors) before displaying the new key size, shape, and/or glyph. FIG. 18 is a diagram illustrating a portion of the I/O device 102 as it transitions between a first set of displayed glyphs to a second set. With reference to FIG. 18, at block (1), the first key 110a displays a first glyph 112a and the second key 110b displays a second glyph 112b. As the I/O device 102 begins to dynamically change its displayed, the display of the I/O device 102 may transition to block (2). At block (2), the I/O device 102 may display "sparkles" or randomly activated dots, asterisks, or other desired graphics. The block (2) graphic may be a transition graphic 204 that may cover the entire length of the I/O device 102 or a portion thereof (e.g., just the keys that are changing). In lieu of graphics, the electric field may be varied to attract ink to the outer surfaces of one or more pigment capsules 140. If the electric field is varied on a relatively discrete basis (for example, a particle by particle basis) and the ink particles 146 contain a reflective pigment or other element, a sparkling effect may occur.

After the transition graphic has been displayed, the I/O device 102 may then display the new glyphs 114a, 114b for the keys 110a, 110b as shown in block (3). It should be noted that in some embodiments, the size and/or shape of the keys 110a, 110b may also change (as shown in FIG. 2C), and thus the transition graphic 204 may also be applied between transitions between key sizes and shapes, as well as transitions between glyphs.

The transition graphic may be substantially any image or images that are desired. For example, the transition graphic may be a display of one color (e.g., black of white) or may be a display of multiple colors, shapes of the like. In one embodiment, the transition graphic may include a logo, trademark, or the like. Additionally, the transition graphic may be modified when the computing device 100 is turned on or off.

By displaying the transition graphic 204 between changes in the display of the I/O device 102, lag that may occur in the display due to the pigment particles 144, 146 changing may be hidden. For example, by using a transition graphic 204 that appears to "sparkle," the lag between pixel changes may be obscured behind the asterisks or stars. In other words, the transition graphic 204 may be configured to resist or hide contrast degradation that may occur as electric field in the ink structure 128 is modified and the pigment particles 144, 146 change orientation.

In some embodiments, the transition graphic 204 may be a pattern that matches the enclosure 106 or other portions of the computing device 100. In these embodiments, the I/O device 102 may be appear uniform with the enclosure 106 during a transition, which may enhance the contrast of the glyphs when they are displayed after the transition graphic 204.

In other examples, groups of pixels may be refreshed at different times to avoid the entire display flashing white or black as the display is refreshed. In one example, a spacing distance may be defined that may determine the minimum separation between refreshing pixels and non-refreshing pixels. By spacing the refreshing pixels apart from non-refreshing pixels, the transition between a first glyph and a second glyph (or other display transition) may be less noticeable to a user and may appear more seamless. In a second example, pixels to be refreshed at a given time may be selected randomly and there may be a time delay between each group of refreshing pixels. In this example, a predetermined group of pixels may be refreshed at a time, with the predetermined number being less than the total number of pixels in the display. Similar to the first example, in this second example, the transition between a first glyph and a second glyph (or button area) may appear seamless.

In other embodiments, pixels to be refreshed may be selected based, at least in part, on the color of the surrounding pixels. For example, pixels in a relatively low color density area of the display may be refreshed first, which may obscure the transitioning pixels within the non-transitioning pixels to create the appearance of faster transition and improve the user experience with the device. As another example, refreshing pixels may be hidden within a dynamic transition. In other words, if one portion of group of pixels for the I/O device 102 is changing, a second portion or group or pixels that may remain unchanged can be refreshed (if necessary). In this example, the refreshing pixels may be embedded within the dynamic change of the display and may not be as obvious to a user.

Edge Transitions

Figure 19:
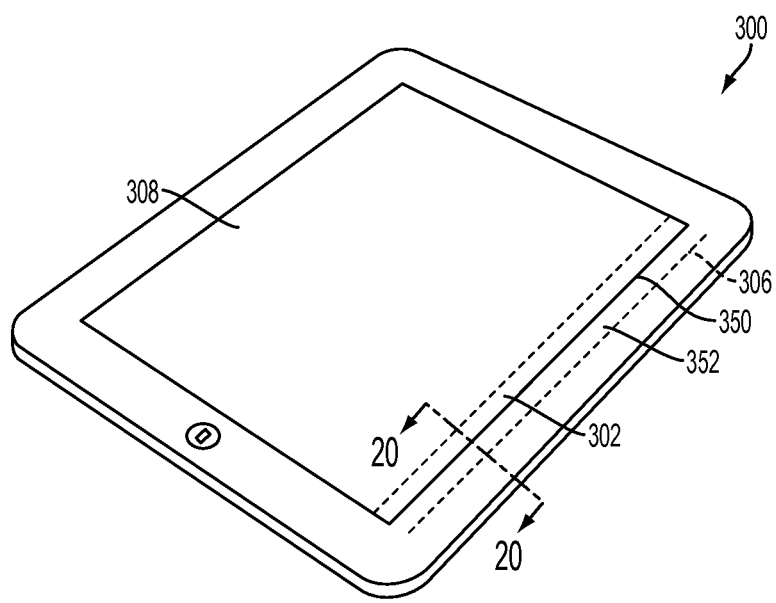
FIG. 19 is a top plan view of another embodiment of the computing device including the I/O device positioned between the display and the enclosure.

The I/O device may be connected with the enclosure and/or display of the computing device in a manner that may provide a transition region between the display and the enclosure. FIG. 19 is a top plan view of another embodiment of the computing device including the I/O device positioned between the display and the enclosure. With reference to FIG. 19, the I/O device 302 may be positioned as a buffer or transition between the display 308 and the enclosure 306 of the computing device 300.

Because the I/O device 302 may have a display that uses e-ink, but still displays glyphs, graphics, and the like, the display 308 (which may be a LCD, plasma, or the like), may appear to more gradually transition into the non-display or bezel region 352 boarding the perimeter of the display 308. Additionally, in this position, the I/O device 302 may provide additional input regions for the computing device 300.

In some embodiments, portions of the I/O device 302 may act to conceal certain proportions of the display, e.g., circuitry and other components that are often concealed in the dead band of an electronic display. As will be described in more detail below, once the pigment particles in the capsules have been set in a particular orientation, power to the I/O device 302 can be removed and the images displayed by the ink may remain displayed. Thus, the I/O device 302 may act to conceal the circuitry elements of the display, but have a permanent character, graphic, or the like, displayed thereon. As another example, the ink layer may be feathered out or gradually decrease from the edge of the display 308 towards the edge of the enclosure 306.

Figure 20:
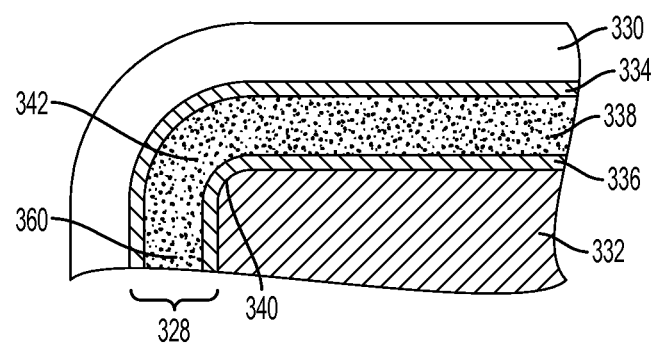
FIG. 20 is a cross-section view of the sample computing device taken along line 20-20 in FIG. 19.

In some embodiments, the I/O device 302 may be applied to a non-planar surface. For example, one or more components of the I/O device 302 may curve around a corner or the like. FIG. 20 is a cross-section view of the computing device taken along line 20-20 in FIG. 19. With reference to FIG. 20, the substrate 332 may include a corner 340 or edge, such as at the edge 350 of the display 308 between the display and the enclosure 306. The ink 328, including the activation layers 334, 334 and ink layer 338 may also bend at a corner 342 to follow the shape of the substrate 332. In some embodiments, a tab 360 may be formed as area of the I/O device 302 as it extends around the corner 342.

The tab 360 may form an active portion of the I/O device 302. In some implementations, the ink 328 may be applied to a non-planar surface, such as by using a thin film transistor display for the activation layers 334, 336, which may allow the activation layers to bend and conform to non-planar surfaces and maintain an electrical connection.

The techniques described herein may be incorporated into a flexible display. For example, the I/O device 102 may be applied to a flexible substrate, which may allow the display of the I/O device to flex or bend. As a specific example, the pockets or cups defining the capsules may be used to form a flexible display that may experience torsion and/or compression.

Dual Mode I/O Device

Figure 21:
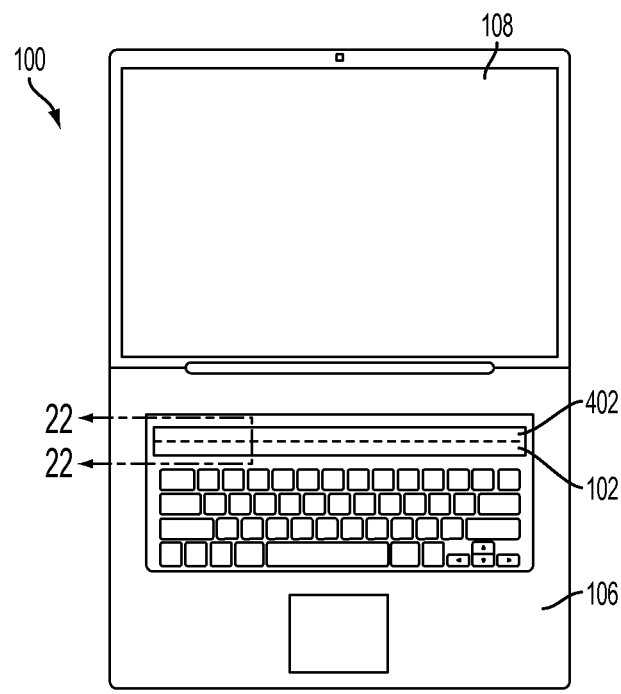
FIG. 21 is a top perspective view of the sample computing device, showing a sample antenna region.
Figure 22:
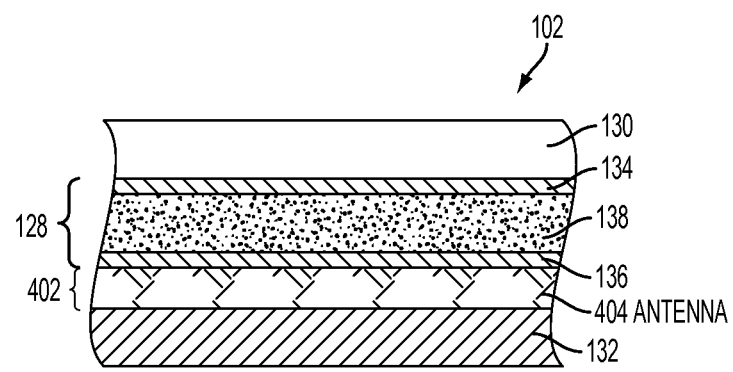
FIG. 22 is a cross-section view of the computing device taken along line 22-22 in FIG. 21.

The I/O device 102 may provide input and output functions, as well as provide communication between one or more components of the computing device or other computing devices. FIG. 21 is a top perspective view of the computing device 100 including an antenna region. FIG. 22 is a cross-section view of the computing device taken along line 22-22 in FIG. 21. With reference to FIGS. 21 and 22, the computing device 100 may include an antenna region 402 connected with the I/O device 102. The antenna region 402 may form a part of the I/O device 102 or be separated therefrom. In one embodiment, an antenna component 404 may be positioned beneath at least a portion of the I/O device 102, e.g., below the ink layer 138 and the activation layers 134, 136.

The antenna 404 may be substantially any component that may transmit and/or receive radio signals. The antenna 404 may be positioned below one or more layers of the I/O device 102. For example, in embodiments where the ink structure 128 is e-ink, the ink layer 138 and the activation layers 134, 136 may be dielectric materials. Continuing with this example, due to the dielectric nature of the materials, radio waves transmitted from the antenna 404 may be transmitted therethrough. In these embodiments, the size of the computing device 100 may be reduced as portions of the enclosure 106 that are typically reserved for an antenna may be used of the I/O device 102, while still maintaining the transmission properties.

It should be noted that although the antenna 404 is illustrated as being a separate component from the I/O device 102, in some embodiments the antenna 404 may be integrated with one or more components of the I/O device 102. For example, one or both of the activation layers 134, 136 may a material that can also function as antenna. As one example, one or both of the activation layers may include thin film transistors on a glass or other substrate and the transistor layer could be used as an antenna.

Although in FIG. 22 the antenna 404 is illustrated as being positioned beneath the ink structure 128, in some embodiments, the antenna may 404 may adjacent the ink structure 128. For example, the antenna reign 402 may include the protective layer 130 and the antenna 404 component, but the ink structure 128 may be omitted. In this embodiment, the protective layer 130 may include one or more modifying films that may allow the antenna 404 to appear similar to the ink structure 128, so that the antenna region 402 may have a substantially uniform appearance with the I/O device 102.

Lower or No Power Display

Figure 23:
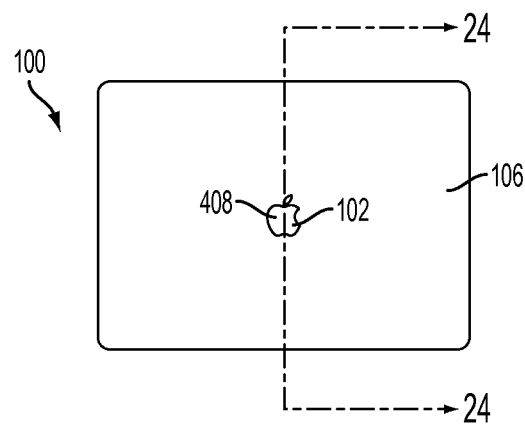
FIG. 23 is a top plan view of a back side of the upper enclosure of the computing device.
Figure 24:
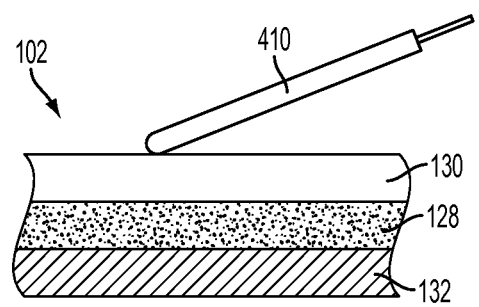
FIG. 24 is a cross-section view of the computing device taken along line 24-24 in FIG. 23.

In some embodiments, the I/O device 102 may be used to create a graphic for the electronic device that may be variable, but may not require a substantial amount of power. FIG. 23 is a top plan view of a back side of the upper enclosure 106 of the computing device 100. FIG. 24 is a cross-section view of the computing device taken along line 24-24 in FIG. 23. With reference to FIGS. 23 and 24, the ink structure 128 of the I/O device may be visible through a window defined into enclosure to create a graph 408. The graphic 408 may be defined by one or more apertures in the enclosure 106 and the orientation of the I/O device 102. The graphic 408 may be substantially any type of image, such as, but not limited to, a trademark, logo, glyph, symbol, or the like.

In the embodiment illustrated in FIGS. 23 and 24, the I/O device 102 may be configured to only provide a visual output and may thus save power consumption. However in other embodiments, the I/O device 102 may be configured to receive user inputs in addition to providing the visual output. Additionally or alternatively, the I/O device 102 may be configured to modify one or more characteristics of the graphic 408, such as the color, pattern, or the like, based on one or more inputs, parameters, or the like.

With reference to FIG. 24, in embodiments, where I/O device 102 may be low powered (or may be disconnected from a power supply), the graphic 408 may be substantially static. To form the graphic, the pigment particles 144, 146 may be stimulated in a particular manner by a stimulating wand 410. The wand 410 may vary the electric field applied to the pigment particles 144, 146 (without or in addition to the activate layers). Because the wand 410 may be an external component from the I/O device 102, the I/O device 102 may not need to include a connection to a power supply. Additionally, once the graphic 408 has been set by the wand 410, the graphic 408 may be somewhat permanent (at least until the electric field experienced by the pigment particles is varied again).

In some embodiments, with reference to FIGS. 11 and 23, the I/O device 102 may include the light source positioned beneath the portions of the ink structure 128 exposed through the enclosure 106. In this example, the light source 172 may illuminate the graphic 408. The illumination for the graphic 408 may enhance the contrast between the graphic and the enclosure and my provide an output to the user indicating a change in status of the computing device (e.g., the light source may be activated when the computer turns on). In this example, the light source may be a discrete light source, such as a light emitting diode or may be light from the backside of the display 108 or other source of light of the computing device 100. In embodiments where the light source may be from another element of the computing device 100, the ink structure 128 may act to somewhat filter the light to reduce its brightness. For example, with a high resolution display, using the display light to illuminate the graphic without reducing or filtering the light may result in a very bright graphic, which could be unappealing to some users.

Sensing Functions

Figure 25:
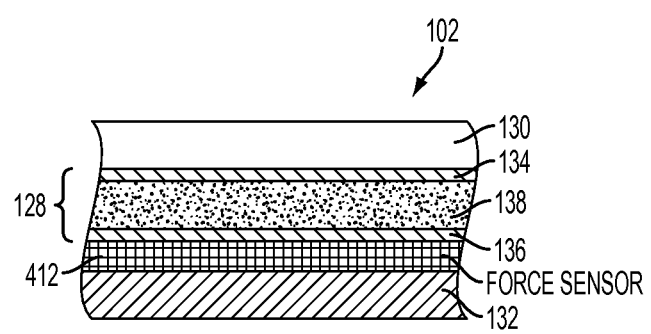
FIG. 25 is a cross-section view of the I/O device, showing a force sensor.

In some embodiments, the I/O device 102 may include one or more sensors to detect user inputs. As described above, the protective layer 130 may include one or more capacitive sensors components that may detect a user's touch. However, other sensing mechanisms are also envisioned. FIG. 25 is a cross-section view of the I/O device 102 including a force sensor. With reference to FIG. 25, a force sensor 412 may be sandwiched in the stack of the I/O device 102. In some examples, such as the example shown in FIG. 25, the force sensor 412 may be positioned between the ink structure 128 and the substrate 132. In other examples, the force sensor 412 may be connected to a portion of the protective layer 130 or the like.

The force sensor 412 may be substantially any type of sensor that may detect a change in force. For example, the force sensor 412 may include a cantilevered beam anchored to one portion of the enclosure 106 that can bend due to deflection of the I/O device 102. In this example, the strain sensed by the beam may be translated to an input force and may be used by the I/O device 102 as a user input.

Additionally or alternatively, in some embodiments, the I/O device 102 may include one or more haptic actuators that may provide feedback to the user. For example, the haptic actuators may rotate or laterally move the protective cover 130 or the entire I/O structure in response to a user input. This may provide feedback to a user, in addition to the visual feedback provided by the display of the I/O device 102.

CONCLUSION

The foregoing description has broad application. For example, while examples disclosed herein may focus on discrete embodiments, it should be appreciated that the concepts disclosed herein may be combined together and implemented in a single structure. Additionally, although the various embodiments may be discussed with respect to e-ink, the techniques and structures may be implemented using substantially any other type of modifiable display. Accordingly, the discussion of any embodiment is meant only to be an example and is not intended to suggest that the scope of the disclosure, including the claims, is limited to these examples.

What is claimed is:

1. A computing device, comprising:
   an enclosure;
   a display coupled to the enclosure;
   a processor operatively coupled to the display; and
   an input/output device operatively coupled to the processor and positioned at least partially within the enclosure; wherein
   the input/output device includes a modifiable display configured to:
      display a first set of symbols; and
      in response to the computing device performing a media playback function:
         transition to a second set of symbols different than the first set of symbols; and
         define a slide input region corresponding to one of the second set of symbols, the slide input region configured to receive a sliding touch input along the slide input region.

2. The computing device of claim 1, wherein the input/output device comprises:
an ink layer including the modifiable display; and
at least one activation layer; wherein
the activation layer changes the modifiable display of the ink layer.

3. The computing device of claim 2, wherein the input/output device further comprises a substrate, wherein the at least one activation layer is supported by the substrate.

4. The computing device of claim 3, wherein the substrate is perforated.

5. The computing device of claim 2, wherein the input/output device further comprises a modifying film operably connected to the ink layer.

6. The computing device of claim 5, wherein the modifying film includes at least one of a textured or a faceted surface.

7. The computing device of claim 5, wherein the modifying film is reflective.

8. The computing device of claim 2, wherein the ink layer comprises a plurality of capsules, each capsule including a plurality of pigment particles suspended therein.

9. The computing device of claim 8, wherein at least a portion of the pigment particles is reflective.

10. The computing device of claim 8, wherein at least a portion of the pigment particles is substantially transparent.

11. The computing device of claim 8, wherein the plurality of capsules includes a first set of capsules having a first diameter and a second set of capsules having a second diameter.

12. The computing device of claim 8, wherein:
the computing device further comprises a keyboard positioned within a lower portion of the computing device;
the input/output device is positioned within the lower portion of the computing device next to the keyboard; and
the display is positioned within an upper portion of the computing device.

13. The computing device of claim 12, wherein the upper portion of the computing device is rotatably coupled to the lower portion of the computing device.

14. A computing input device, comprising:
a first input device having a first input region located along a surface of the computing input device; and
a second input device positioned along the surface of the computing input device next to the first input region; wherein
the second input device is one of a keyboard, track pad, or mouse; and
the first input device is configured to:
display a first group of dynamically configurable symbols;
define a first group of dynamically configurable input areas corresponding to the first group of dynamically configurable symbols;
transition the first group of dynamically configurable symbols to a distinct second group of dynamically configurable symbols;
transition the first group of dynamically configurable input areas to a second distinct group of dynamically configurable input areas;
the second distinct group of dynamically configurable input areas comprises a slide input area configured to receive touch input as an object moves along the slide input area.

15. The computing input device of claim 14, wherein the first input device is further configured to define the second group of dynamically configurable input areas such that the second group of dynamically configurable input areas comprises fewer input areas than the first group of dynamically configurable input areas.

16. The computing input device of claim 15, wherein:
the first input device includes a touch sensor; and
the second input device includes a switch.

17. The computing input device of claim 16, wherein the first input device comprises:
an e-ink layer;
a substrate supporting the e-ink layer;
a film overlying the e-ink layer; and
the touch sensor positioned between the substrate and the film.

18. The computing input device of claim 17, wherein the e-ink layer is configured to display groups of adjacent pixels that refresh at different times.

19. The computing input device of claim 17, wherein a quantity of particles in the e-ink layer has a light reflectance that matches a light reflectance of the surface.

20. The computing input device of claim 17, wherein a quantity of particles in the e-ink layer is fluorescent.

21. A computing device, comprising:
an enclosure;
a display coupled to the enclosure;
a keyboard positioned at least partially within the enclosure and including a first set of keys having a corresponding set of static symbols; and
an input/output device positioned next to the keyboard and configured to:
define a second set of keys having a corresponding set of symbols and set of input areas;
transition the second set of keys to a third set of keys; and
within the third set of keys, define a slide key configured to receive a sliding touch input along the slide key.

22. The computing device of claim 21, wherein the input/output device is configured to transition the second set of keys to the third set of keys in response to an application being executed on the computing device.

23. The computing device of claim 21, wherein:
the second set of keys corresponds to a keyboard function row; and
the third set of keys corresponds to a set of multimedia control functions.

24. The computing device of claim 21, wherein the slide key has an input that varies in magnitude along a length of the slide key.

25. The computing device of claim 21, wherein:
the set of input areas is a first set of input areas: and
the third set of keys has a corresponding second set of input areas that varies in size and shape as compared to the first set of input areas.

* * * * *